United States Patent
Zhamu et al.

(10) Patent No.: US 10,637,043 B2
(45) Date of Patent: Apr. 28, 2020

(54) ANODE PARTICULATES OR CATHODE PARTICULATES AND ALKALI METAL BATTERIES CONTAINING SAME

(71) Applicant: Nanotek Instruments, Inc., Dayton, OH (US)

(72) Inventors: Aruna Zhamu, Springboro, OH (US); Hui He, Dayton, OH (US); Baofei Pan, Dayton, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 194 days.

(21) Appl. No.: 15/827,754

(22) Filed: Nov. 30, 2017

(65) Prior Publication Data

US 2019/0165365 A1    May 30, 2019

(51) Int. Cl.
*H01M 4/133* (2010.01)
*H01M 4/1391* (2010.01)
(Continued)

(52) U.S. Cl.
CPC .......... *H01M 4/133* (2013.01); *C01B 19/007* (2013.01); *C01B 21/064* (2013.01); *C01B 32/194* (2017.08); *C01B 32/20* (2017.08); *C01G 19/02* (2013.01); *C01G 31/006* (2013.01); *C01G 39/06* (2013.01); *C01G 45/02* (2013.01);
(Continued)

(58) Field of Classification Search
CPC .. H01M 4/133; H01M 4/1391; H01M 4/1393; H01M 10/0525; C01B 32/194; C01B 32/20; C01B 19/007; C01B 21/064; C01G 19/02; C01G 31/006; C01G 39/06; C01G 45/02; C01G 51/04
See application file for complete search history.

(56) References Cited

U.S. PATENT DOCUMENTS

| | | |
|---|---|---|
| 5,523,179 A | 6/1996 | Chu |
| 5,670,278 A | 9/1997 | Disselbeck et al. |

(Continued)

OTHER PUBLICATIONS

Long et al., "Polymer electrolytes for lithium polymer batteries" J. Mater.Chem. A (2016) vol. 4, p. 10038-10069.
(Continued)

*Primary Examiner* — Helen Oi K Conley

(57) ABSTRACT

Provided is an anode particulate, having a dimension from 10 nm to 100 μm, for use in an alkali metal battery, the particulate comprising (i) an anode active material capable of reversibly absorbing and desorbing lithium ions or sodium ions, (ii) an electron-conducting material, and (iii) a lithium ion-conducting or sodium ion-conducting electrolyte, wherein the electron-conducting material forms a three dimensional network of electron-conducting pathways in electronic contact with the anode active material and the electrolyte forms a three dimensional network of lithium ion- or sodium ion-conducting channels in ionic contact with the anode active material. The particulate can be of any shape, but preferably spherical or ellipsoidal in shape. Also provided is a cathode in a particulate form containing a cathode active material, an electron-conducting material forming a three dimensional network of electron-conducting pathways, and a lithium ion-conducting or sodium ion-conducting electrolyte forming a three dimensional network of ion-conducting channels.

34 Claims, 10 Drawing Sheets

(51) Int. Cl.
    *H01M 10/0525* (2010.01)
    *H01M 4/1393* (2010.01)
    *C01B 21/064* (2006.01)
    *C01G 31/00* (2006.01)
    *C01G 51/04* (2006.01)
    *C01G 19/02* (2006.01)
    *C01G 45/02* (2006.01)
    *C01B 32/20* (2017.01)
    *C01B 32/194* (2017.01)
    *C01B 19/00* (2006.01)
    *C01G 39/06* (2006.01)
    *C01G 31/02* (2006.01)
    *H01M 4/02* (2006.01)

(52) U.S. Cl.
    CPC .......... *C01G 51/04* (2013.01); *H01M 4/1391* (2013.01); *H01M 4/1393* (2013.01); *H01M 10/0525* (2013.01); *C01G 31/02* (2013.01); *C01P 2004/61* (2013.01); *C01P 2004/62* (2013.01); *C01P 2004/64* (2013.01); *C01P 2006/40* (2013.01); *H01M 2004/027* (2013.01)

(56) References Cited

U.S. PATENT DOCUMENTS

| | | | |
|---|---|---|---|
| 5,919,587 | A | 7/1999 | Mukherjee et al. |
| 6,030,720 | A | 2/2000 | Chu et al. |
| 7,759,008 | B2 | 7/2010 | Barker et al. |
| 8,801,810 | B1 | 8/2014 | Cui et al. |
| 9,812,736 | B2 | 11/2017 | He et al. |
| 9,960,451 | B1 | 5/2018 | Zhamu et al. |
| 2005/0271574 | A1 | 12/2005 | Jang et al. |
| 2009/0305135 | A1 | 12/2009 | Shi et al. |
| 2011/0200848 | A1 | 8/2011 | Chiang et al. |
| 2012/0088154 | A1 | 4/2012 | Liu et al. |
| 2013/0045427 | A1 | 2/2013 | Zhamu et al. |
| 2013/0171339 | A1 | 7/2013 | Wang et al. |
| 2013/0183548 | A1 | 7/2013 | Kourtakis et al. |
| 2013/0337319 | A1 | 12/2013 | Doherty et al. |
| 2014/0170524 | A1 | 6/2014 | Chiang et al. |
| 2014/0193721 | A1 | 7/2014 | Suto |
| 2014/0234702 | A1 | 8/2014 | Zhang et al. |
| 2014/0255780 | A1 | 9/2014 | Mikhaylik et al. |
| 2014/0315097 | A1 | 10/2014 | Tan et al. |
| 2014/0342249 | A1 | 11/2014 | He et al. |
| 2015/0024121 | A1 | 1/2015 | He et al. |
| 2015/0044556 | A1 | 2/2015 | Wang et al. |
| 2015/0044564 | A1 | 2/2015 | Wang et al. |
| 2015/0084604 | A1 | 3/2015 | Thillaiyan et al. |
| 2015/0349307 | A1 | 12/2015 | Dadheech et al. |
| 2015/0364773 | A1 | 12/2015 | Tamirisa et al. |
| 2016/0056490 | A1 | 2/2016 | Chiang et al. |
| 2016/0164081 | A1 | 6/2016 | Cui et al. |
| 2017/0005327 | A1 | 1/2017 | Goodenough et al. |
| 2017/0077546 | A1 | 3/2017 | Zhamu et al. |
| 2017/0338472 | A1 | 11/2017 | Zhamu et al. |
| 2018/0090794 | A1 | 3/2018 | Amasaki et al. |
| 2018/0233722 | A1 | 8/2018 | Holman et al. |
| 2018/0342737 | A1 | 11/2018 | Zhamu et al. |

OTHER PUBLICATIONS

PCT/US18/59164 International Search Report and Written Opinion dated Jan. 11, 2019, 12 pages.
PCT/US18/59192 International Search Report and Written Opinion dated Feb. 27, 2019, 16 pages.
U.S. Appl. No. 15/604,607 Nonfinal Office Action dated Nov. 2, 2018, 9 pages.
U.S. Appl. No. 15/608,597 Nonfinal Office Action dated Dec. 10, 2018, 17 pages.
U.S. Appl. No. 15/610,136 Nonfinal Office Action dated Oct. 19, 2018, 6 pages.
U.S. Appl. No. 15/612,537 Nonfinal Office Action dated Dec. 26, 2018, 24 pages.
U.S. Appl. No. 15/638,854 Nonfinal Office Action dated Jan. 22, 2019, 9 pages.
Ji et al., "A highly ordered nanostructured carbon-sulphur cathode for lithium-sulphur batteries" Nature Materials (2009) vol. 8, pp. 500-506.
PCT/US18/22141 International Search Report and Written Opinion dated May 21, 2018, 14 pages.

ANODE PARTICULATES OR CATHODE PARTICULATES AND ALKALI METAL BATTERIES CONTAINING SAME

FIELD OF THE INVENTION

The present invention relates to the field of alkali batteries (e.g. lithium or sodium batteries), including primary (non-rechargeable) and secondary (rechargeable) alkali metal batteries and alkali ion batteries having a new structure and geometry that deliver both high energy densities and high power densities.

BACKGROUND OF THE INVENTION

Historically, today's most favorite rechargeable energy storage devices—lithium-ion batteries—actually evolved from rechargeable "lithium metal batteries" using lithium (Li) metal or Li alloy as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). However, there are safety problems caused by sharply uneven Li growth (formation of Li dendrites) as the metal is re-plated during each subsequent recharge cycle. As the number of cycles increases, these dendritic or tree-like Li structures could eventually traverse the separator to reach the cathode, causing internal short-circuiting.

To overcome these safety issues, several alternative approaches were proposed in which either the electrolyte or the anode was modified. One approach involved replacing Li metal by graphite (another Li insertion material) as the anode. The operation of such a battery involves shuttling Li ions between two Li insertion compounds, hence the name "Li-ion battery." Presumably because of the presence of Li in its ionic rather than metallic state, Li-ion batteries are inherently safer than Li-metal batteries. Lithium ion battery is a prime candidate energy storage device for electric vehicle (EV), renewable energy storage, and smart grid applications.

As a totally distinct class of energy storage device, sodium batteries have been considered an attractive alternative to lithium batteries since sodium is abundant and the production of sodium is significantly more environmentally benign compared to the production of lithium. In addition, the high cost of lithium is a major issue and Na batteries potentially can be of significantly lower cost.

There are at least two types of batteries that operate on bouncing sodium ions (Na$^+$) back and forth between an anode and a cathode: the sodium metal battery having Na metal or alloy as the anode active material and the sodium-ion battery having a Na intercalation compound as the anode active material. Sodium ion batteries using a hard carbon-based anode active material (a Na intercalation compound) and a sodium transition metal phosphate as a cathode have been described by several research groups; e.g. J. Barker, et al. "Sodium Ion Batteries," U.S. Pat. No. 7,759,008 (Jul. 20, 2010).

However, these sodium ion-based devices exhibit even lower specific energies and rate capabilities than Li-ion batteries. The anode active materials for Na intercalation and the cathode active materials for Na intercalation have lower Na storage capacities as compared with their Li storage capacities. For instance, hard carbon particles are capable of storing Li ions up to 300-360 mAh/g, but the same materials can store Na ions up to 150-250 mAh/g and less than 100 mAh/g for K ion storage.

Instead of hard carbon or other carbonaceous intercalation compound, sodium metal may be used as the anode active material in a sodium metal cell. However, the use of metallic sodium as the anode active material is normally considered undesirable and dangerous due to the dendrite formation, interface aging, and electrolyte incompatibility problems.

Low-capacity anode or cathode active materials are not the only problem that the alkali metal-ion battery industry faces. There are serious design and manufacturing issues that the lithium-ion battery industry does not seem to be aware of, or has largely ignored. For instance, despite the high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm$^2$ and mostly <8 mg/cm$^2$ (areal density=the amount of active materials per electrode cross-sectional area along the electrode thickness direction). The cathode active material amount is typically 1.5-2.5 times higher than the anode active material. As a result, the weight proportion of the anode active material (e.g. graphite or carbon) in a lithium-ion battery is typically from 12% to 17%, and that of the cathode active material (e.g. LiMn$_2$O$_4$) from 17% to 35% (mostly <30%). The weight fraction of the cathode and anode active materials combined is typically from 30% to 45% of the cell weight The low active material mass loading is primarily due to the inability to obtain thicker electrodes (thicker than 100-200 μm) using the conventional slurry coating procedure. This is not a trivial task as one might think and, in reality, the electrode thickness is not a design parameter that can be arbitrarily and freely varied for the purpose of optimizing the cell performance. Contrarily, thicker electrodes would require excessively long oven-drying zones that could run over 100 meters for an electrode thickness of 100 μm. Furthermore, thicker samples tend to become extremely brittle or of poor structural integrity and would also require the use of large amounts of binder resin. The low areal densities and low volume densities (related to thin electrodes and poor packing density) result in a relatively low volumetric capacity and low volumetric energy density of the battery cells. Sodium-ion batteries and potassium-ion batteries have similar problems.

With the growing demand for lighter weight, more compact and portable energy storage systems, there is keen interest to increase the utilization of the volume of the batteries. Novel electrode materials and designs that enable high volumetric capacities and high mass loadings are essential to achieving improved cell volumetric capacities and energy densities for alkali metal batteries.

Therefore, there is clear and urgent need for alkali metal batteries that have high active material mass loading (high areal density), high electrode volume without significantly decreasing the electron and ion transport rates (e.g. without a high electron transport resistance or long lithium or sodium ion diffusion path), high volumetric capacity, high energy density, and high power density.

SUMMARY OF THE INVENTION

The present invention provides a unique anode material composition for an alkali metal battery (e.g. lithium battery or sodium battery). The anode composition is in a form of particulates, wherein a particulate preferably has a dimension (e.g. diameter, thickness, etc.) from 10 nm to 100 μm and, more preferably, from 100 nm to 20 μm.

In certain embodiments, the particulate comprises: (i) an anode active material capable of reversibly absorbing and desorbing lithium ions or sodium ions, (ii) an electron-conducting material (e.g. a conductive polymer, carbon nanotubes, carbon nanofibers, graphene sheets, etc.), and (iii) a lithium ion-conducting or sodium ion-conducting electrolyte, wherein the electron-conducting material forms a 3D network of electron-conducting pathways in electronic contact with the anode active material and the electrolyte forms a 3D network of lithium ion- or sodium ion-conducting channels in ionic contact with the anode active material and wherein said anode particulate has an electrical conductivity from about $10^{-6}$ S/cm to about 300 S/cm. The anode particulate may further comprise a resin binder or matrix, which is not required or desired.

In certain embodiments, the alkali metal battery is a lithium-ion battery and the anode active material is selected from the group consisting of: (a) particles of natural graphite, artificial graphite, mesocarbon microbeads (MCMB), needle coke, carbon particles, carbon fibers, carbon nanotubes, and carbon nanofibers; (b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) alloys or intermetallic compounds of Si, Ge, Sn, Pb, Sb, Bi, Zn, Al, or Cd with other elements, wherein said alloys or compounds are stoichiometric or non-stoichiometric; (d) oxides, carbides, nitrides, sulfides, phosphides, selenides, and tellurides of Si, Ge, Sn, Nb, Mo, Pb, Sb, Bi, Zn, Al, Fe, Ni, Co, Ti, Mn, or Cd, and their mixtures or composites; (e) prelithiated versions thereof; (f) pre-lithiated graphene sheets; and (g) combinations thereof.

In certain preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, prelithiated $Mn_3O_4$, prelithiated $TiNb_2O_7$, $Li_4Ti_5O_{12}$, or a combination thereof, wherein $1 \leq x \leq 2$.

The pre-lithiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

In certain other embodiments, the alkali metal battery is a sodium-ion battery and the anode active material contains an alkali intercalation compound selected from the following groups of materials: (a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) sodium- or potassium-containing alloys or intermetallic compounds of Si, Ge, Sn, Pb, Sb, Bi, Zn, Al, Ti, Co, Ni, Mn, Cd, and their mixtures; (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) sodium or potassium salts; and (e) graphene sheets pre-loaded with sodium or potassium.

In some preferred embodiments, the alkali metal battery is a sodium-ion battery and the anode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ ($0.2 \leq x \leq 1.0$), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

Preferably, the anode active material is in a form of nano particle, nano wire, nanofiber, nanotube, nanosheet, nanobelt, nanoribbon, nanodisc, nanoplatelet, or nanohorn having a thickness or diameter from 0.5 nm to 100 nm (preferably no greater than 20 nm). The anode active material may be coated with a layer of carbon, a conducting polymer, or a graphene sheet.

In the anode particulate, the electron-conducting polymer may be selected from polyaniline, polypyrrole, polythiophene, polyfuran, a bi-cyclic polymer, a sulfonated derivative thereof, or a combination thereof.

There is no restriction on the type of electrolyte that can be used. However, preferably, the electrolyte has a lithium ion conductivity or sodium ion conductivity no less than $10^{-7}$ S/cm at room temperature and more preferably from $10^{-5}$ S/cm to $5 \times 10^{-2}$ S/cm. The electrolyte may be selected from an aqueous electrolyte, an organic liquid electrolyte, an ionic liquid electrolyte, a polymer gel electrolyte, a polymer electrolyte, an inorganic solid-state electrolyte, a quasi-solid electrolyte, or a combination thereof.

In the anode particulate, the electron-conducting material may be selected from a conducting polymer, a carbon fiber or graphite fiber, a carbon nanotube, a carbon nanofiber, a graphitic nanofiber, a conductive polymer fiber, a metal nanowire, a metal-coated fiber, a graphene sheet, an expanded graphite platelet, carbon black, acetylene black, needle coke, or a combination thereof.

The present invention also provides a powder mass containing a plurality of the anode particulates as defined the foregoing paragraphs. The invention also provides an anode containing multiple anode particulates of the present invention, each composed of (i) an anode active material capable of reversibly absorbing and desorbing lithium ions or sodium ions, (ii) an electron-conducting material (e.g. a conductive polymer, carbon nanotubes, carbon nanofibers, graphene sheets, etc.), and (iii) a lithium ion-conducting or sodium ion-conducting electrolyte, wherein the electron-conducting material forms a 3D network of electron-conducting pathways in electronic contact with the anode active material and the electrolyte forms a 3D network of lithium ion- or sodium ion-conducting channels in ionic contact with the anode active material.

When these multiple particulates are packed together to form an anode electrode, the 3D network of electron-conducting pathways in individual particulates are merged into an extensive or large 3D network of electron-conducting pathways that can cover the entire anode electrode. Further, when these multiple particulates are packed together to form an anode electrode, the 3D network of ion-conducting channels in individual particulates are merged into an extensive or large 3D network of lithium ion- or sodium ion-conducting channels that can cover the entire anode electrode.

The invention also provides a lithium battery or sodium battery, which contains an optional anode current collector, the anode as defined above, a cathode containing a cathode active material, an optional cathode current collector, an electrolyte in ionic contact with the anode and the cathode, and an optional porous separator. This electrolyte can be the same as or different than the electrolyte disposed in the individual anode particulates.

Preferably, the cathode also contains multiple cathode particulates, wherein a cathode particulate is composed of (i) a cathode active material capable of reversibly absorbing and desorbing lithium ions or sodium ions, (ii) an electron-conducting material (e.g. a conductive polymer, carbon nanotubes, carbon nanofibers, graphene sheets, etc.), and (iii) a lithium ion-conducting or sodium ion-conducting electrolyte, wherein the electron-conducting material forms a 3D network of electron-conducting pathways in electronic contact with the cathode active material and the electrolyte forms a 3D network of lithium ion- or sodium ion-conducting channels in ionic contact with the cathode active material, and wherein said anode particulate has an electrical conductivity from about $10^{-6}$ S/cm to about 300 S/cm. The cathode particulate preferably has a dimension from 10 nm to 100 μm and an electrical conductivity from about $10^{-4}$ S/cm to about 300 S/cm. The electrolyte in the cathode particulates can be different than or the same as the electrolyte in the anode particulates.

The invention also provides a powder mass containing multiple cathode particulates as defined above. Also provided is a cathode electrode containing multiple cathode particulates of this nature.

The invented lithium battery or sodium battery may be a lithium-ion battery, sodium-ion battery, lithium metal battery, sodium metal battery, lithium-sulfur battery, room temperature sodium-sulfur battery, lithium-selenium battery, sodium-air battery, or lithium-air battery.

In certain embodiments, the invented battery is a sodium battery, wherein the anode contains the presently invented anode particulates and the cathode contains a cathode active material (preferably also in the presently invented cathode particulate form) containing a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $λ-MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

In the presently invented lithium battery or sodium battery, the cathode active material may comprise an alkali metal intercalation compound or alkali metal-absorbing compound selected from an inorganic material, an organic or polymeric material, a metal oxide/phosphate/sulfide, or a combination thereof. Preferably, the cathode active material is also in the presently invented particulate form.

In certain preferred embodiments, the metal oxide/phosphate/sulfide is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, transition metal fluoride, transition metal chloride, or a combination thereof.

The inorganic material is selected from sulfur, sulfur compound, lithium polysulfide, transition metal dichalcogenide, a transition metal trichalcogenide, or a combination thereof. The inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Preferably, the inorganic material is selected from $TiS_2$, $TaS_2$, $MoS_2$, $NbSe_3$, $MnO_2$, $CoO_2$, an iron oxide, a vanadium oxide, or a combination thereof.

In certain embodiments, the metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 \leq x \leq 5$.

In certain embodiments, in the invented lithium battery or sodium battery, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In the lithium battery or sodium battery, the organic material or polymeric material may be selected from Poly (anthraquinonyl sulfide) (PAQS), a lithium oxocarbon, 3,4,9,10-perylenetetracarboxylic dianhydride (PTCDA), poly (anthraquinonyl sulfide), pyrene-4,5,9,10-tetraone (PYT), polymer-bound PYT, Quino(triazene), redox-active organic material, Tetracyanoquino-dimethane (TCNQ), tetracyano-ethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In certain embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

Preferably, the cathode active material contains an alkali metal intercalation compound or alkali metal-absorbing compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel which are in a nanowire, nanodisc, nanoribbon, or nanoplatelet form having a thickness or diameter less than 100 nm, preferably <50 nm, and most preferably <20 nm.

DESCRIPTION OF THE PREFERRED EMBODIMENTS

This invention is directed at an alkali metal battery exhibiting an exceptionally high volumetric energy density and high gravimetric energy density. This alkali metal battery can be a primary battery, but is preferably a secondary battery selected from a lithium-ion battery or a lithium metal secondary battery (e.g. using lithium metal as an anode active material), a sodium-ion battery, a sodium metal battery, a potassium-ion battery, or a potassium metal battery. The battery is based on an aqueous electrolyte, a non-aqueous organic electrolyte, a gel electrolyte, an ionic liquid electrolyte, a polymer electrolyte, a solid-state electrolyte, or a combination thereof. The final shape of an alkali metal battery can be cylindrical, rectangular, cuboidal, etc. The present invention is not limited to any battery shape or configuration.

In certain embodiments, the battery comprises (a) an anode having an anode active material, (b) a cathode containing a cathode active material, and (c) a separator-electrolyte layer, comprising a first electrolyte alone or a first electrolyte-porous separator assembly layer (e.g. a porous membrane wetted with a liquid or gel electrolyte or a solid-state electrolyte alone without an additional polymer membrane) in ionic contact with the anode and the cathode.

The anode active material is in a form of multiple anode particulates that are packed together and possibly bonded together with a resin binder. The individual particulate comprises: (i) an anode active material capable of reversibly absorbing and desorbing lithium ions or sodium ions, (ii) an electron-conducting material (e.g. a conductive polymer, carbon nanotubes, carbon nanofibers, graphene sheets, etc.), and (iii) a lithium ion-conducting or sodium ion-conducting electrolyte, wherein the electron-conducting material forms a 3D network of electron-conducting pathways in electronic contact with the anode active material and the electrolyte forms a 3D network of lithium ion- or sodium ion-conducting channels in ionic contact with said anode active material. In certain embodiments, the anode active material occupies 50-95% of the total anode particulate weight; the conductive material occupying 0.5 to 15% and the electrolyte typically 5-35% by weight.

Figure 1A:
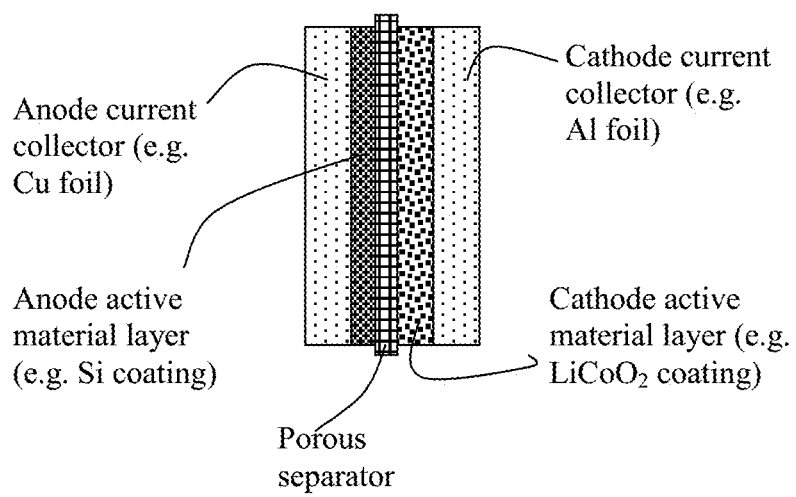
FIG. 1(A) Schematic of a prior art lithium-ion battery cell (as an example of an alkali metal battery) composed of an anode current collector, an anode electrode layer (e.g. thin Si coating layer), a porous separator, a cathode layer (e.g. sulfur layer), and a cathode current collector.
Figure 1B:
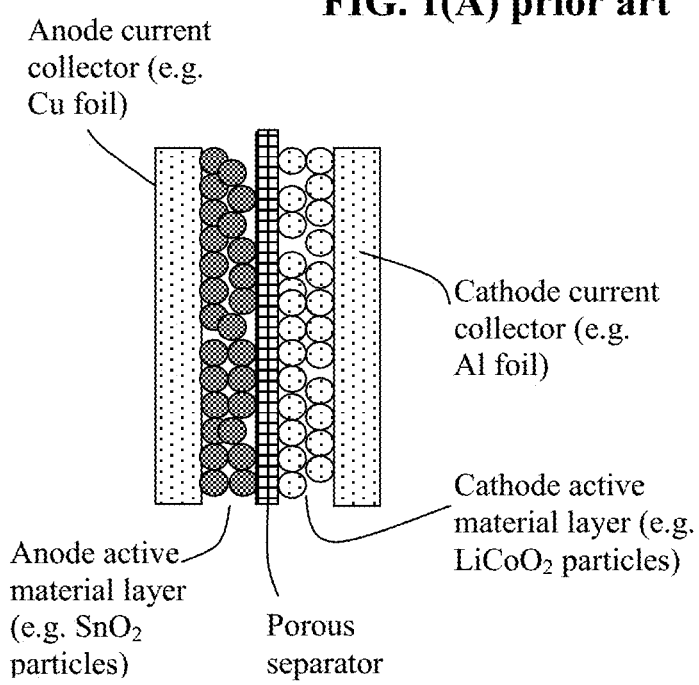
FIG. 1(B) Schematic of a prior art lithium-ion battery cell (as an example of an alkali metal battery), wherein the electrode layer is composed of discrete particles of an active material (e.g. graphite or tin oxide particles in the anode layer or $LiCoO_2$ in the cathode layer).
Figure 1C:
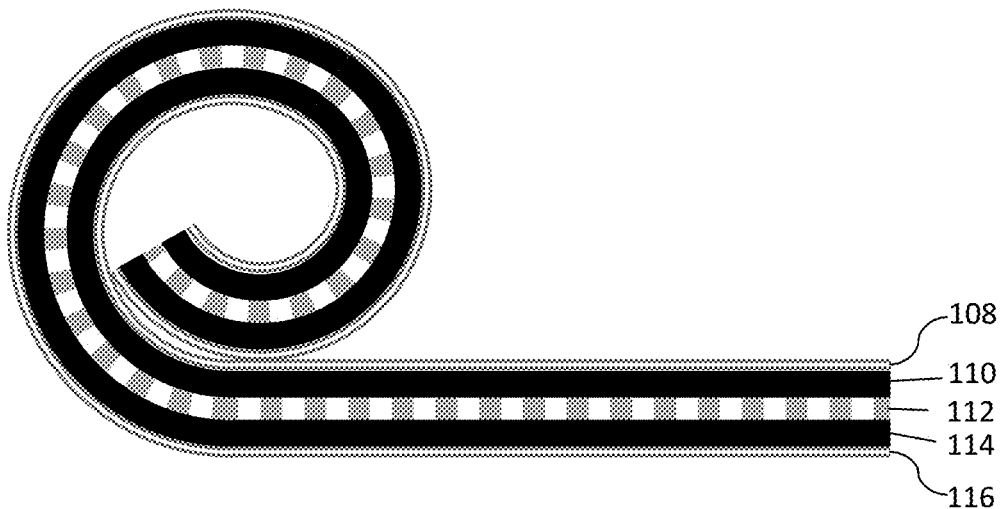
FIG. 1(C) Schematic of part of an internal structure of a prior art cylindrical lithium-ion battery cell, indicating the roll contains a laminated structure of an anode layer coated on an anode current collector, a porous separator, and a cathode layer coated on a cathode current collector, which is wound to form a cylindrical roll.
Figure 1D:
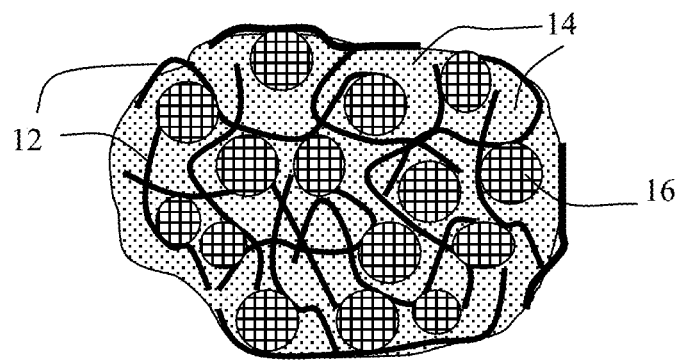
FIG. 1(D) Schematic drawing of a presently invented anode particulate.

As illustrated in FIG. 1(D) as a preferred embodiment, the anode particulate is composed of particles (e.g. 16) or fibrils of an anode active material, a conductive material (e.g. carbon nanofibers, 12, or graphene sheets forming a 3D network of electron-conducting pathways), and a matrix of electrolyte, 14 (basically a 3D network of ion-conducting channels). The three components (active material, conductive material, and electrolyte) combined constitute an anode particulate which is in a solid or semi-solid state (having sufficient viscosity to maintain its shape during handling).

A very significant feature of the presently invented anode is the notion that, when these multiple anode particulates are packed together to form an anode electrode, the 3D network of electron-conducting pathways in individual anode particulates are merged into an extensive or large 3D network of electron-conducting pathways that can cover substantially the entire anode electrode. Further, when these multiple anode particulates are packed together to form an anode electrode, the 3D network of ion-conducting channels in individual particulates are merged into an extensive or giant 3D network of lithium ion- or sodium ion-conducting channels that can cover substantially the entire anode electrode. As such, the entire anode has a 3D network of electron-conducting pathways and a 3D network of lithium ion- or sodium ion-conducting channels that are in contact with the anode active material. The giant 3D network of electron-conducting pathways is in electronic contact with an anode current collector and/or a terminal tab that serves as a conduit through which electrons can travel in and out of the entire anode.

It may be noted that the electrolyte in the anode particulate may contain a lithium salt or sodium salt, a liquid medium (solvent, such as PC, DEC, and EC), and/or an ion-conducting polymer (e.g., PEG, PEO, PAN, etc.). Typically at least two of the three ingredients are included in a particulate. The solvent may then be added to the electrode or cell after the electrode or cell is made.

The invention also provides a lithium battery or sodium battery, which contains an optional anode current collector, the presently invented anode containing anode particulates as defined above, a cathode containing a cathode active material, an optional cathode current collector, an electrolyte in ionic contact with the anode and the cathode, and an optional porous separator. This electrolyte can be the same as or different than the electrolyte disposed in the individual anode particulates. Preferably, the cathode active material is also in the presently invented particulate form.

Figure 1E:
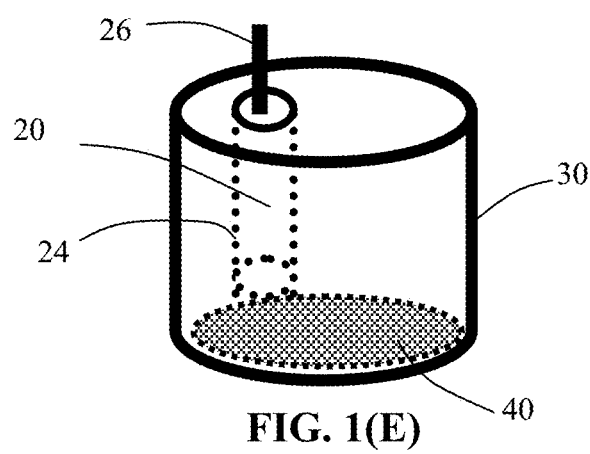
FIG. 1(E) Schematic drawing of an alkali metal battery containing anode particulates in the anode rod and cathode particulate in the cathode mass.
Figure 1F:
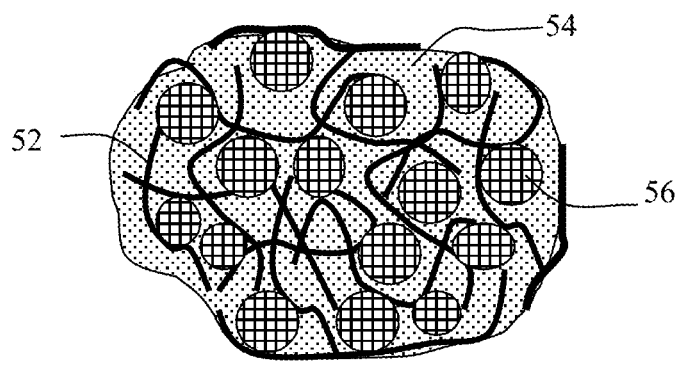
FIG. 1(F) Schematic of a presently invented cathode particulate.

Thus, in certain preferred embodiments (as illustrated in FIG. 1(F)), the cathode also contains multiple cathode particulates, wherein a cathode particulate is composed of (i) a cathode active material (e.g. 56) capable of reversibly absorbing and desorbing lithium ions or sodium ions, (ii) an electron-conducting material (e.g. a conductive polymer, carbon nanotubes 52, carbon nanofibers, graphene sheets, etc.), and (iii) a lithium ion-conducting or sodium ion-conducting electrolyte 54, wherein the electron-conducting material forms a 3D network of electron-conducting pathways in electronic contact with the cathode active material and the electrolyte forms a 3D network of lithium ion- or sodium ion-conducting channels in ionic contact with the cathode active material. The electrolyte in the cathode particulates can be different than or the same as the electrolyte in the anode particulates. In certain embodiments, the cathode active material occupies 50-95% of the total cathode particulate weight; the conductive material occupying 0.5 to 15% and the electrolyte typically 5-35% by weight.

When these multiple cathode particulates are packed together to form a cathode electrode, the 3D network of electron-conducting pathways in individual cathode particulates are merged into an extensive or giant 3D network of electron-conducting pathways that can cover substantially the entire cathode electrode. Further, when these multiple cathode particulates are packed together to form a cathode electrode, the 3D network of ion-conducting channels in individual cathode particulates are merged into an extensive or giant 3D network of lithium ion- or sodium ion-conducting channels that can cover substantially the entire cathode electrode. As such, the entire cathode has a 3D network of electron-conducting pathways and a 3D network of lithium ion- or sodium ion-conducting channels that are in contact with the cathode active material. The giant 3D network of electron-conducting pathways is in electronic contact with a cathode current collector and/or a terminal tab that serves as a conduit through which electrons can travel in and out of the entire cathode.

For convenience, we will use selected materials, such as lithium iron phosphate (LFP), vanadium oxide ($V_xO_y$), lithium nickel manganese cobalt oxide (NMC), dilithium rhodizonate ($Li_2C_6O_6$), and copper phthalocyanine (CuPc) as illustrative examples of the cathode active material, and graphite, SnO, $Co_3O_4$, and Si particles as examples of the anode active material. For sodium batteries, we will use selected materials, such as $NaFePO_4$ and $\lambda$-$MnO_2$ particles, as illustrative examples of the cathode active material, and hard carbon and $NaTi_2(PO_4)_3$ particles as examples of the anode active material of a Na-ion cell. Similar approaches are applicable to K-ion batteries. Nickel foam, graphite foam, graphene foam, and stainless steel fiber webs are used as examples of conductive porous layers as intended current collectors. These should not be construed as limiting the scope of the invention.

As illustrated in FIG. 1(A), FIG. 1(B), and FIG. 1(C), a conventional lithium-ion battery cell is typically composed of an anode current collector (e.g. Cu foil), an anode electrode (anode active material layer) coated on the anode current collector, a porous separator and/or an electrolyte component, a cathode electrode (cathode active material layer) coated on the two primary surfaces of a cathode current collector, and a cathode current collector (e.g. Al foil). Although only one anode layer is shown, there can be two anode active material layers coated on the two primary surfaces of the anode current collector. Similarly, there can be two cathode active material layers coated on the two primary surfaces of the cathode current collectors.

In a more commonly used cell configuration (FIG. 1(B)), the anode layer is composed of particles of an anode active material (e.g. graphite or Si), a conductive additive (e.g. carbon black particles), and a resin binder (e.g. SBR or PVDF, not shown in the figure) that bonds the active material particles and the conductive additive together to form an anode layer of structural integrity required for subsequent steps of battery cell production. The cathode layer is composed of particles of a cathode active material (e.g. LFP particles), a conductive additive (e.g. carbon black particles), and a resin binder (e.g. PVDF).

Both the anode and the cathode layers are typically up to 100-200 μm thick to give rise to a presumably sufficient amount of current per unit footprint electrode area. This thickness range is considered an industry-accepted constraint under which a battery designer normally works under. This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); (c) thicker electrodes are prone to delaminate or crack upon drying or handling after roll-coating; and (d) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 1(A), either the anode active material (e.g. Si or Li metal) or the cathode active material (e.g. lithium transition metal oxide) is deposited in a thin film form directly onto a current collector, such as a sheet of copper foil or Al foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application.

On the anode side, a Si layer thicker than 100 nm has been found to exhibit poor cracking resistance during battery charge/discharge cycles. It takes but a few cycles for the electrode to get fragmented. On the cathode side, a sputtered layer of lithium metal oxide thicker than 100 nm does not allow lithium ions to fully penetrate and reach full body of the cathode layer, resulting in a poor cathode active material utilization rate. A desirable electrode thickness is at least 100 µm, with individual active material coating or particles having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electrochemists alike for more than 30 years, by developing a new form of anode materials and a new form of cathode material that enable the production of a alkali metal battery without the aforementioned issues. The invention also provides processes for producing anode particulate, cathode particulates, the anode, the cathode, and such a battery.

The prior art lithium battery cell is typically made by a process that includes the following steps: (a) The first step includes mixing particles of the anode active material (e.g. Si nanoparticles or mesocarbon micro-beads, MCMBs), a conductive filler (e.g. graphite flakes), a resin binder (e.g. PVDF) in a solvent (e.g. NMP) to form an anode slurry. On a separate basis, particles of the cathode active material (e.g. LFP particles), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a lithium battery cell.

There are several serious problems associated with the conventional process and the resulting lithium-ion battery cell or sodium-ion cell:

1) It is very difficult to produce an electrode layer (anode layer or cathode layer) that is thicker than 200 µm (100 µm on each side of a solid current collector, such as Al foil) and, thus, there is limited amount of active materials that can be included in a unit battery cell. There are several reasons why this is the case. An electrode of 100-200 µm in thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 µm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >200 Wh/kg. In most cases, the anode active material mass loading of the electrodes (areal density) is significantly lower than 25 mg/cm$^2$ and the apparent volume density or tap density of the active material is typically less than 1.2 g/cm$^3$ even for relatively large particles of graphite. The cathode active material mass loading of the electrodes (areal density) is significantly lower than 45 mg/cm$^2$ for lithium metal oxide-type inorganic materials and lower than 15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in relatively low gravimetric energy density and low volumetric energy density.

3) The conventional process requires dispersing electrode active materials (anode active material or cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again.

Such a wet-dry-wet process does not sound like a good process at all. Furthermore, NMP is a highly regulated solvent and must be handled with care and additional equipment is required to capture the vaporized NMP for re-use. Solvent recycling equipment is typically very expensive.

4) Current lithium-ion batteries still suffer from a relatively low gravimetric energy density and low volumetric energy density. Commercially available lithium-ion batteries exhibit a gravimetric energy density of approximately 150-220 Wh/kg and a volumetric energy density of 450-600 Wh/L.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. graphite or carbon) in a lithium-ion battery being typically from 12% to 17%, and that of the cathode active material (e.g. $LiMn_2O_4$) from 20% to 35%.

Schematically shown in FIG. 1(C) is part of an internal structure of a prior art cylindrical lithium-ion battery cell, indicating that each battery cell contains a roll, which is composed of a laminate of an anode layer 110 coated on an anode current collector 108, a porous separator 112, and a cathode layer 114 coated on a cathode current collector 116.

The presently invented anode particulates (as schematically illustrated in FIG. 1(D)) and the cathode particulates (as schematically illustrated in FIG. 1(F)) each already have the three necessary ingredients (an active material, an electron-conducting additive, and an ion-conducting matrix (electrolyte) to function as an electrode. Such a feature enables a lithium-ion or sodium-ion battery cell to be produced using a wide variety of highly cost-effective and elegantly simple methods. These methods can eliminate the shortcomings of the conventional processes and resulting batteries. The resulting battery cell can be in any geometric shape or dimensions.

As an example, a simple and easy-to-make battery cell configuration is illustrated in FIG. 1(E). The cell contains a chamber 30 that accommodates a mass of multiple cathode particulates, which are in electronic contact with a cathode current collector 40 at the bottom of the chamber. A cylindrical bar 20 composed of anode particulates wrapped around by a porous membrane 24 is inserted into the chamber 30. The membrane serves as a separator that electronically isolates the anode from the cathode, but is permeable to lithium or sodium ions. There can be multiple anode bars like 20 that are inserted into the mass of cathode particulates in the chamber. For each anode bar, there can be an anode current collector (e.g. Cu wire, 26) inserted into the anode bar and in electronic contact with the giant 3D network of electron-conducting pathways. Further, instead of a plate-like cathode current collector (e.g. 40), one may choose to implement a plurality of Al wires into the mass of the cathode particulates contained inside chamber 30.

Most significantly, the presently invented anode particulates and cathode particulates make it possible to avoid the problems associated with the conventional slurry coating process for manufacturing current lithium-ion or sodium-ion batteries: the use of undesirable solvents (e.g. NMP), difficulty in producing thicker electrodes, low areal mass density of active materials, and significantly lower energy density than is otherwise possible. The invention also makes it possible to develop and implement technically feasible and economically viable processes.

The electron-conducting material may be selected from intrinsically conducting polymer chains, metal nanowires, conductive polymer nanofibers, conductive polymer-coated fibers, carbon nanofibers, carbon nanotubes, graphene sheets, expanded graphite platelets, carbon fibers, graphite fibers, needle coke, carbon black particles, or a combination thereof.

Additionally, in each anode electrode or cathode electrode, all electrode active material particles are pre-dispersed in or mixed with an electrolyte (no electrolyte non-wettability or inaccessibility issues), eliminating the existence of dry pockets commonly present in an electrode prepared by the conventional process of wet coating, drying, packing, and electrolyte injection.

In a preferred embodiment, the anode active material is a prelithiated or pre-sodiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon micro-bead, soft carbon, hard carbon, coke, carbon fiber, carbon nanofiber, carbon nanotube, or a combination thereof. Graphene materials are also a good conductive additive for both the anode and cathode active materials of an alkali metal battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes.

As used herein, the term "single-layer graphene" encompasses graphene materials having one graphene plane. The term "few-layer graphene" encompasses graphene materials having 2-10 graphene planes. The term "pristine graphene" encompasses a graphene material having essentially zero % (less than 0.01%) of non-carbon elements. The term "non-pristine graphene" encompasses graphene material having 0.01% to 50% by weight of non-carbon elements, preferably <5% by weight. The term "doped graphene" encompasses graphene material having less than 10% of a non-carbon element. This non-carbon element can include hydrogen, oxygen, nitrogen, magnesium, iron, sulfur, fluorine, bromine, iodine, boron, phosphorus, sodium, and combinations thereof. The term "reduced graphene oxide" encompasses material having an oxygen content of 0.01%-5% by weight. Graphene oxide encompassed material having 0.01%-50% by weight of oxygen.

Single-layer graphene and multi-layer graphene sheets are collectively called "nano graphene platelets" (NGPs). Graphene sheets/platelets (collectively, NGPs) are a new class of carbon nanomaterial (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nanofiber (CNF).

Figure 2:
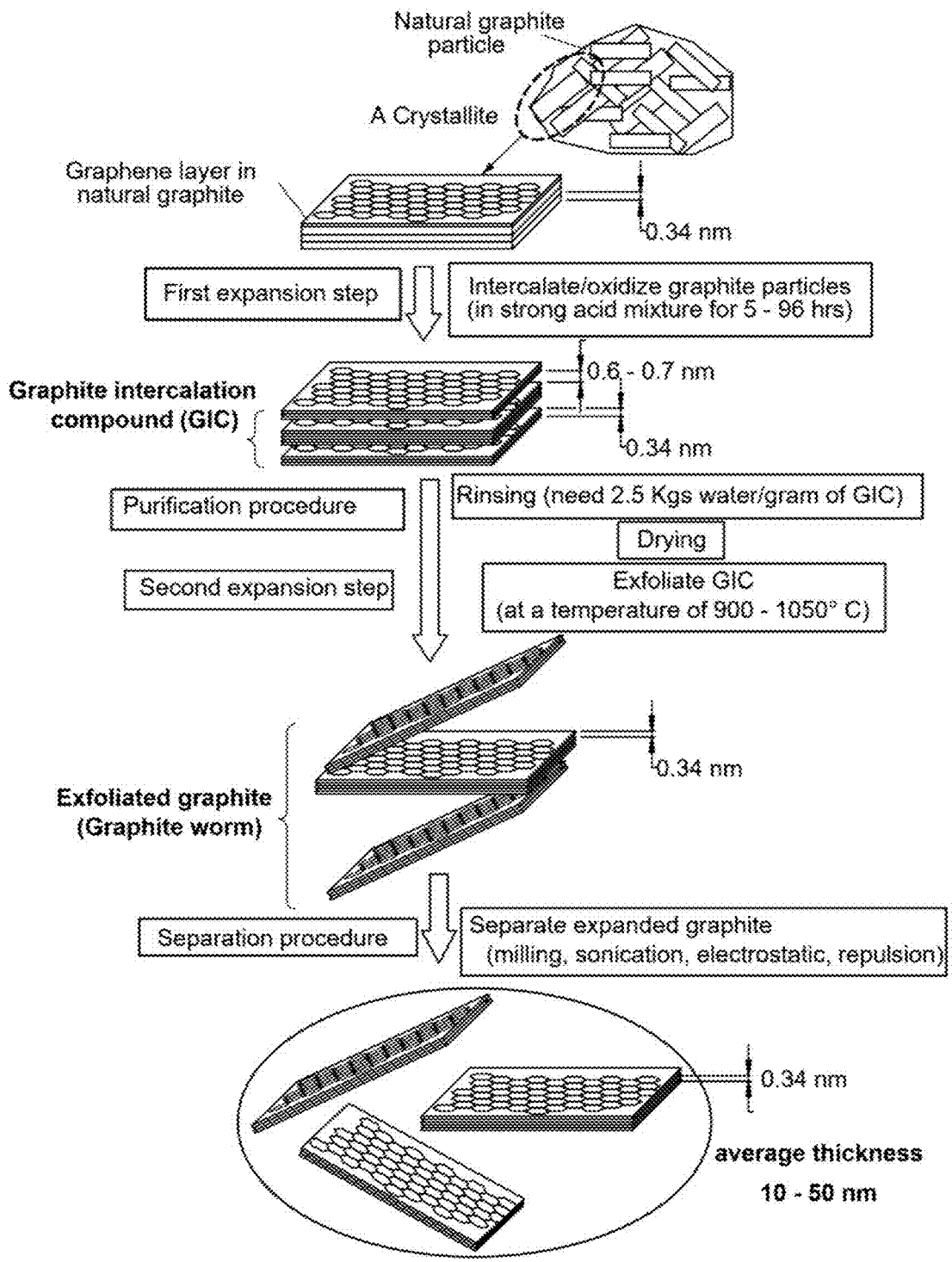
FIG. 2 Schematic of a commonly used process for producing exfoliated graphite, expanded graphite flakes (thickness >100 nm), and graphene sheets (thickness <100 nm, more typically <10 nm, and can be as thin as 0.34 nm).

In one process, graphene materials are obtained by intercalating natural graphite particles with a strong acid and/or an oxidizing agent to obtain a graphite intercalation compound (GIC) or graphite oxide (GO), as illustrated in FIG. 2. The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder in a mixture of sulfuric acid, nitric acid (an oxidizing agent), and another oxidizing agent (e.g. potassium permanganate or sodium perchlorate). The resulting GIC is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms", which are each a collection of exfoliated, but largely un-separated graphite flakes that remain interconnected.

The exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs), as disclosed in our U.S. application Ser. No. 10/858,814 (Jun. 3, 2004) (now U.S. Patent Pub. No. 2005/0271574). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

Pristine graphene, in smaller discrete graphene sheets (typically 0.3 µm to 10 µm), may be produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene—this approach entails treating graphene prepared by mechanical exfoliation or by CVD growth with fluorinating agent such as $XeF_2$, or F-based plasmas; and (2) exfoliation of multilayered graphite fluorides. Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

There is no restriction on the types of anode active materials or cathode active materials that can be used in practicing the instant invention. In one preferred embodiment, the anode active material in the invented anode particulate is selected from the group consisting of: (a) particles of natural graphite, artificial graphite, mesocarbon microbeads (MCMB), and carbon (including soft carbon, hard carbon, carbon nanofiber, and carbon nano-tube); (b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (Si, Ge, Al, and Sn are most desirable due to their high specific capacities.) (c) alloys or intermetallic compounds of Si, Ge, Sn, Pb, Sb, Bi, Zn, Al, or Cd with other elements, wherein the alloys or compounds are stoichiometric or non-stoichiometric (e.g. SiAl, SiSn); (d) oxides, carbides, nitrides, sulfides, phosphides, selenides, and tellurides of Si, Ge, Sn, Nb, Mo, Pb, Sb, Bi, Zn, Al, Fe, Ni, Co, Ti, Mn, or Cd, and their mixtures or composites (e.g. SnO, $TiO_2$, $Li_4Ti_5O_{12}$, $CO_3O_4$, $TiNb_2O_7$, etc.); (e) pre-lithiated versions thereof (e.g. pre-lithiated $TiO_2$, which is lithium titanate); (f) pre-lithiated graphene sheets; and combinations thereof.

In another preferred embodiment, the anode active material in the anode particulate is a pre-sodiated or pre-potassiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof. Graphene materials are also a good conductive additive for both the anode and cathode active materials of an alkali metal battery.

Particularly desired is an anode active material that contains an alkali intercalation compound selected from petroleum coke, carbon black, amorphous carbon, hard carbon, templated carbon, hollow carbon nanowires, hollow carbon sphere, titanates, $NaTi_2(PO_4)_3$, $Na_2Ti_3O_7$ (Sodium titanate), $Na_2C_8H_4O_4$ (Disodium Terephthalate), $Na_2TP$ (Sodium Terephthalate), $TiO_2$, $Na_xTiO_2$ (x=0.2 to 1.0), carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In an embodiment, the anode may contain a mixture of 2 or 3 types of anode active materials (e.g. mixed particles of activated carbon+$NaTi_2(PO_4)_3$) and the cathode can be a sodium intercalation compound alone (e.g. $Na_xMnO_2$), an electric double layer capacitor-type cathode active material alone (e.g. activated carbon), a redox pair of $\lambda$-$MnO_2$/activated carbon for pseudo-capacitance.

A wide variety of cathode active materials can be used to practice the presently invented process. The cathode active material typically is an alkali metal intercalation compound or alkali metal-absorbing compound that is capable of storing alkali metal ions when the battery is discharged and releasing alkali metal ions into the electrolyte when re-charged. The cathode active material may be selected from an inorganic material, an organic or polymeric material, a metal oxide/phosphate/sulfide (most desired types of inorganic cathode materials), or a combination thereof. Preferably, the cathode active materials are also in a particulate form containing all the three ingredients (cathode active material, 3D conducting network, and electrolyte species) in a particulate.

The group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_8V_6O_{13}$, their doped versions, their derivatives, and combinations thereof, wherein $0.1 \leq x \leq 5$. Lithium transition metal oxide may be selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In the alkali metal cell or alkali metal-ion cell, the cathode active material may contain a sodium intercalation compound (or their potassium counterparts) selected from $NaFePO_4$ (Sodium iron phosphate), $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$ (Sodium cobalt oxide), $Na_{2/3}[Ni_{1/3}Mn_{2/3}]O_2$, $Na_x(Fe_{1/2}Mn_{1/2})O_2$, $Na_xMnO_2$ (Sodium manganese bronze), $\lambda$-$MnO_2$, $Na_{0.44}MnO_2$, $Na_{0.44}MnO_2$/C, $Na_4Mn_9O_{18}$, $NaFe_2Mn(PO_4)_3$, $Na_2Ti_3O_7$, $Ni_{1/3}Mn_{1/3}CO_{1/3}O_2$, $Cu_{0.56}Ni_{0.44}HCF$ (Copper and nickel hexacyanoferrate), NiHCF (nickel hexacyanoferrate), $Na_xCoO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_yS_z$ (Selenium and Selenium/Sulfur, z/y from 0.01 to 100), Se (without S), Alluaudites, or a combination thereof.

Other inorganic materials for use as a cathode active material may be selected from sulfur, sulfur compound, lithium polysulfide, transition metal dichalcogenide, a transition metal trichalcogenide, or a combination thereof. In particular, the inorganic material is selected from $TiS_2$, $TaS_2$, $MoS_2$, $NbSe_3$, $MnO_2$, $CoO_2$, an iron oxide, a vanadium oxide, or a combination thereof. These will be further discussed later.

In particular, the inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

Alternatively, the cathode active material may be selected from a functional material or nanostructured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nanostructured material may be selected from the group consisting of (a) a nanostructured or porous disordered carbon material selected from a soft carbon, hard carbon, polymeric carbon or carbonized resin, mesophase carbon, coke, carbonized pitch, carbon black, activated carbon, nanocellular carbon foam or partially graphitized carbon; (b) a nanographene platelet selected from a single-layer graphene sheet or multi-layer graphene platelet; (c) a carbon nanotube selected from a single-walled carbon nanotube or multi-walled carbon nanotube; (d) a carbon nanofiber, nanowire, metal oxide nanowire or nanofiber, conductive polymer nanofiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$ (Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —$NH_2$, —OR, or —COOR, where R is a hydrocarbon radical.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([($NPS_2)_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may be selected from a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The lithium intercalation compound or lithium-absorbing compound may be selected from a metal carbide, metal nitride, metal boride, metal dichalcogenide, or a combination thereof. Preferably, the lithium intercalation compound or lithium-absorbing compound is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form.

We have discovered that a wide variety of two-dimensional (2D) inorganic materials can be used as a cathode active material in the presented invented lithium battery prepared by the invented direct active material-electrolyte injection process. Layered materials represent a diverse source of 2D systems that can exhibit unexpected electronic properties and good affinity to lithium ions. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Preferably, the lithium intercalation compound or lithium-absorbing compound is selected from nanodiscs, nanoplatelets, nanocoating, or nanosheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The lithium intercalation compound or lithium-absorbing compound may contain nanodiscs, nanoplatelets, nanocoating, or nanosheets of a compound selected from: (i) bismuth selenide or bismuth telluride, (ii) transition metal dichalcogenide or trichalcogenide, (iii) sulfide, selenide, or telluride of niobium, zirconium, molybdenum, hafnium, tantalum, tungsten, titanium, cobalt, manganese, iron, nickel, or a transition metal; (iv) boron nitride, or (v) a combination thereof, wherein the discs, platelets, coating, or sheets have a thickness less than 100 nm.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

A wide range of electrolytes can be used for practicing the instant invention. Most preferred are non-aqueous organic and/or ionic liquid electrolytes, along with a polymer or an inorganic solid-state electrolyte, in the anode particulate or the cathode particulate. For use between the anode and the cathode, solid state electrolyte is preferred.

The non-aqueous electrolyte to be employed herein may be produced by dissolving an electrolytic salt in a non-aqueous solvent. Any known non-aqueous solvent which has been employed as a solvent for a lithium secondary battery can be employed. The organic solvent may contain a liquid solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (y-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

For use in a sodium cell or potassium cell, the organic electrolyte may contain an alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

There is no restriction on the type of solid state electrolyte that can be used for practicing the instant invention. The solid state electrolytes can be selected from a solid polymer-, metal oxide type (e.g. LIPON), solid sulfide type (e.g. $Li_2S$—$P_2S_5$), halide-type, hydride-type, and nitride-type, etc. The main inorganic solid electrolytes that can be used are perovskite-type, NASICON-type, garnet-type and sulfide-type materials. The representative perovskite solid electrolyte is $Li_{3x}La_{2/3-x}TiO_3$, which exhibits a lithium-ion conductivity exceeding $10^{-3}$ S/cm at room temperature.

NASICON-type compounds generally have an $AM_2(PO_4)_3$ formula with the A site occupied by Li, Na or K. The M site is usually occupied by Ge, Zr or Ti. In particular, the $LiTi_2(PO_4)_3$ system is particularly useful. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La), with Al substitution being the most effective.

Garnet-type materials have the general formula $A_3B_2Si_3O_{12}$, in which the A and B cations have eight-fold and six-fold coordination, respectively. Some representative systems are $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$=Nb or Ta; B=In or Zr) and the cubic systems $Li_7La_3Zr_2O_{12}$ and $Li_{7.06}M_3Y_{0.06}Zr_{1.94}O_{12}$=La, Nb or Ta). The room temperature ionic conductivity of $Li_{6.5}La_3Zr_{1.75}Te_{0.25}O_{12}$ is $1.02 \times 10^{-3}$ S/cm.

The polymer gel or polymer electrolyte may be based on ion-conducting polymer having a lithium ion- or sodium ion conductivity from $10^{-7}$ to $5 \times 10^{-2}$ S/cm. Examples include sodium ion-conducting or lithium ion-conducting polymer selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

In certain embodiments, the ion-conducting polymer may be preferably selected from poly(ethylene oxide) (PEO), Polypropylene oxide, poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, and poly(vinylidene fluoride)-hexafluoropropylene (PVDF-HFP), a derivative thereof, or a combination thereof.

Each of the presently invented anode particulates or cathode particulates contains particles of an active material (an anode active material or cathode active material), a conductive material, and an electrolyte or portion of an electrolyte. These component materials may be combined together to form secondary particles (particulates) having sufficient integrity and rigidity to allow for subsequent handling (e.g. for dispensing into a cathode chamber or an anode chamber). A small amount of polymer (particularly, an ion-conducting polymer), in an amount of 0.1%-35% (preferably 0.5-10%) of the total particulate weight, may be advantageously mixed into the particulates to help hold the three major ingredients together. Such an ion-conducting polymer preferably is the same as or compatible with the polymer as part of a polymer gel electrolyte or polymer solid electrolyte. This polymer may partially encapsulate the particulate.

There are two broad categories of particulate formation methods that can be implemented to produce secondary particles (particulates): physical methods and chemical methods. The physical methods include pan-coating, air-suspension coating, ball-milling, centrifugal extrusion, vibration nozzle, and spray-drying methods. The chemical methods include interfacial polycondensation, interfacial cross-linking, in-situ polymerization, and matrix polymerization. The polymer used must have an ion conductivity no less than $10^{-7}$ S/cm.

Pan-coating method: The pan coating process involves tumbling the active material particles (along with conductive material particles and electrolyte ingredients) in a pan or a similar device while the encapsulating material (e.g. monomer/oligomer, polymer melt, polymer/solvent solution) is applied slowly until a desired mixing and degree of encapsulating is attained.

Air-suspension coating method: In the air suspension coating process, the solid particles (e.g. active material, conductive fibrils, lithium salt, etc.) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are coated with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Mixtures of active material particles, conductive additive, and electrolyte may be well mixed and encapsulated with a polymer using a rotating extrusion head containing concentric nozzles. In this process, a stream of core fluid (slurry containing these particles dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of particulates can be produced per nozzle per hour and extrusion heads containing 16 nozzles are readily available.

Vibrational nozzle method: Core-shell encapsulation or matrix-encapsulation of a mixture of active material-conductive material-electrolyte can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material mixture when the active material mixture is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material (plus conductive material and electrolyte ingredients).

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material mixture and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material (the mixture of active material particles, conductive material, and electrolyte ingredients) in a polymeric matrix during formation of the particles. This can be accomplished via spray-drying, in which the particles are formed by evaporation of the solvent from the matrix material. Another possible route is the notion that the solidification of the matrix is caused by a chemical change.

In what follows, we provide examples for a large number of different types of anode active materials, cathode active materials, and conductive materials to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Anode Particulates of Si Nano Particles, Carbon Nanofibers (CNFs), and Lithium Salt First, Si nanoparticles and CNFs at a weight ratio of 95:5 were dispersed in an organic liquid electrolyte, containing 1.0 M of $LiPF_6$ dissolved in PC-EC, to form a slurry. Then, 0.2% by wt. of poly(ethylene oxide) (PEO) was added into the slurry to form a gel-like mass, which was diluted by adding some acetonitrile (AN) to the extent that the overall solid content was approximately 10% by weight. The resulting slurry was spray-dried to remove AN and form anode particulates that were approximately 15-32 μm in diameter.

Example 2: Anode Particulates of Cobalt Oxide ($Co_3O_4$)—CNT-Lithium Salt

An appropriate amount of inorganic salts $Co(NO_3)_2.6H_2O$ and ammonia solution ($NH_3.H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. A portion of the $Co_3O_4$ particles was then mixed and coated with ultrahigh molecular weight (UHMW) PEO according to the following procedure:

UHMW PEO having a MW of $5.0 \times 10^6$ was dissolved in DI-water (1.6 wt. %) to form a homogenous and clear solution. Then, two routes were followed to prepare polymer-containing $Co_3O_4$ particles. In the first route, $Co_3O_4$ particles and CNTs, at a weight ratio from 96:4 to 70:30, were dispersed in the UHMW PEO-water solution to form a series of slurries. The slurry was each spray-dried to form particulates of polymer-encapsulated $Co_3O_4$ particles.

In the second route, 5-35% of lithium salt ($LiClO_4$) was dissolved in the PEO-water solution to form a series of lithium-salt containing solutions. Then, $Co_3O_4$ particles and CNTs, at a weight ratio from 96:4 to 70:30, were dispersed in the lithium salt-containing UHMW PEO-water solution to form a series of slurries. Each slurry was spray-dried to form particulates of polymer/lithium salt/$Co_3O_4$ particles, wherein the CNTs were found to exceed percolation as reflected by a good electrical conductivity value, typically from wherein said anode particulate has an electrical conductivity from about $10^{-1}$ S/cm to about 20 S/cm.

In the preparation of the desired lithium battery cells, a solvent (ethylene carbonate or EC+a lithium salt) was added into the cell, allowing the solvent to permeate into the amorphous zones of the polymer phase to form a polymer gel electrolyte in the anode particulates.

Example 3: Particulates of Tin Oxide-Lithium Borofluoride ($LiBF_4$)—PC/DEC-Expanded Graphite Platelets Tin oxide ($SnO_2$) nanoparticles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product, $SnO_2$ nanoparticles, was heat-treated at 400° C. for 2 h under Ar atmosphere.

Ultra-high molecular weight polyacrylonitrile (UHMW PAN) was used here to hold ingredients of an anode particulate together. UHMW PAN (0.1 g) was dissolved in 5 ml of dimethylformamide (DMF) to form a solution. The $SnO_2$ nanoparticles, lithium borofluoride ($LiBF_4$), and fine platelets of expanded graphite (0.3 μm wide and 110 nm thick) were then dispersed in the solution to form a slurry. The slurry was then subjected to a micro-encapsulation procedure using a vibration nozzle method to produce solid anode particulates.

Example 4: Preparation of Graphene Oxide (GO) and Reduced Graphene Oxide (RGO) Nanosheets (as a Preferred Conductive Material) from Natural Graphite Powder Natural graphite was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO sheets were used as a conductive material that could form a 3D network of electron-conducting pathways in an anode particulate or a cathode particulate. In addition, pre-lithiated RGO (e.g. RGO+lithium particles or RGO pre-deposited with lithium coating) was also used as an anode active material.

Example 5: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive (or a discrete conductive material layer) having a high electrical and thermal conductivity. Pre-lithiated pristine graphene and pre-sodiated pristine graphene were also used as an anode active material for a lithium-ion battery and a sodium-ion battery, respectively. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets were used as a conductive material in an anode particulate or a cathode particulate.

Example 6: Preparation of Prelithiated and Pre-Sodiated Graphene Fluoride Sheets as an Anode Active Material of a Lithium-Ion Battery or Sodium-Ion Battery Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with surface-stabilized lithium powder and in a liquid electrolyte, allowing for pre-lithiation to occur before being included in an anode particulate. Pre-sodiation of graphene fluoride was conducted electrochemically using a procedure substantially similar to a plating procedure.

Example 7: Lithium Iron Phosphate (LFP) Cathode of a Lithium Metal Battery

LFP powder, un-coated or carbon-coated, is commercially available from several sources. A gel electrolyte (PEO-EC/

DEC) containing a lithium salt was first prepared. LFP particles and GO sheets (prepared in Example 4) were then dispersed into the gel electrolyte. The resulting slurry was then simply heated in an oven to form cathode particulates having a diameter from 25-36 μm.

Example 8: Preparation of Disodium Terephthalate ($Na_2C_8H_4O_4$) as an Anode Active Material of a Sodium-Ion Battery Pure disodium terephthalate was obtained by the recrystallization method. An aqueous solution was prepared via the addition of terephthalic acid to an aqueous NaOH solution and then ethanol (EtOH) was added to the mixture to precipitate disodium terephthalate in a water/EtOH mixture. Because of resonance stabilization, terephtalic acid has relatively low pKa values, which allow easy deprotonation by NaOH, affording disodium terephthalate ($Na_2TP$) through the acid-base chemistry. In a typical procedure, terephthalic acid (3.00 g, 18.06 mmol) was treated with sodium hydroxide (1.517 g, 37.93 mmol) in EtOH (60 mL) at room temperature. After 24 h, the suspended reaction mixture was centrifuged and the supernatant solution was decanted. The precipitate was re-dispersed in EtOH and then centrifuged again. This procedure was repeated twice to yield a white solid. The product was dried in vacuum at 150° C. for 1 h. In a separate sample, GO was added to aqueous NaOH solution (5% by wt. of GO sheets) to prepare sheets of graphene-supported disodium terephthalate under comparable reaction conditions.

The carbon-disodium terephthalate mixture powder and graphene sheets (or graphene-supported disodium terephthalate) were added into a sodium salt-electrolyte solution (sodium perchlorate ($NaClO_4$+EC and MEC) to prepare a suspension. The suspension was then made into cathode particulates using a vibration nozzle method.

Example 9: $V_2O_5$ as an Example of a Transition Metal Oxide Cathode Active Material of a Lithium Battery $V_2O_5$ powder alone is commercially available. For the preparation of a graphene-supported $V_2O_5$ powder sample, in a typical experiment, vanadium pentoxide gels were obtained by mixing $V_2O_5$ in a LiCl aqueous solution. The Lit exchanged gels obtained by interaction with LiCl solution (the Li:V molar ratio was maintained as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nanobelt sizes, and then spray-drying at 200° C. to obtain graphene-embraced composite particulates.

Both $V_2O_5$ powder (with a mixture of carbon black powder and graphene sheets as a conductive additive) and graphene-supported $V_2O_5$ powder, separately, along with a liquid electrolyte, were then made into cathode particulates.

Example 10: $LiCoO_2$ as an Example of Lithium Transition Metal Oxide Cathode Active Material for a Lithium-Ion Battery Commercially available $LiCoO_2$ powder, carbon black powder (or RGO sheets) and were dispersed in PC-EC/$LiPF_6$ electrolyte (containing 0.2% of polyethylene glycol) to form a slurry. The slurry was spray-dried to form cathode particulates. Some of the $LiCoO_2$ powder, not in a particulate form of the present invention, was used to prepare conventional cathode to pair up with the presently invented anode particulate-based anode (prepared in Example 1) and, separately, a conventional anode.

Example 11: Cathode Active Materials Based on Mixed Transition Metal Oxides for a Sodium-Ion Cell As examples, for the synthesis of $Na_{1.0}Li_{0.2}Ni_{0.25}Mn_{0.75}O_\delta$, $Ni_{0.25}Mn_{0.75}CO_3$, or $Ni_{0.25}Mn_{0.75}(OH)_2$ cathode active material, $Na_2CO_3$, and $Li_2CO_3$ were used as starting compounds. Materials in appropriate mole ratios were ground together and heat-treated; first at 500° C. for 8 h in air, then finally at 800° C. for 8 h in air, and furnace cooled.

For electrode preparation using a conventional procedure, a sheet of aluminum foil was coated with N-methylpyrrolidinone (NMP) slurry of the cathode mixture. The electrode mixture is composed of 82 wt % active oxide material, 8 wt % conductive carbon black (Timcal Super-P), and 10 wt. % PVDF binder (Kynar). Both $Na_{1.0}Li_{0.2}Ni_{0.25}Mn_{0.75}O_\delta$ powder (with a carbon black powder as a conductive additive) and graphene-supported $Na_{1.0}Li_{0.2}Ni_{0.25}Mn_{0.75}O_\delta$ powder, separately, were used. After casting, the electrode was initially dried at 70° C. for 2 h, followed by dynamic vacuum drying at 80° C. for at least 6 h.

For the preparation of the instant battery, no NMP was involved. Particles of $Ni_{0.25}Mn_{0.75}CO_3$ and CNTs were dispersed in an electrolyte of 1 M of $NaClO_4$ in PC/EC to form a slurry. The slurry was spray-dried to form cathode particulates, which were made into a cathode. Na powder, mixed with graphene sheets, was used as the anode. A conventional battery cell was also made for comparison purpose. The cells were galvanostatically cycled to a cutoff of 4.2 V vs. Na/$Na^+$ (15 mA/g) and then discharged at various current rates to a cutoff voltage of 2.0 V.

In all battery cells prepared, charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined, but excluding the current collector). The specific charge capacity refers to the amount of charges per unit mass of the composite cathode. The specific energy and specific power values presented in this section are based on the total cell weight for all pouch cells. The morphological or microstructural changes of selected samples after a desired number of repeated charging and recharging cycles were observed using both transmission electron microscopy (TEM) and scanning electron microscopy (SEM).

Example 12: $Na_3V_2(PO_4)_3$/C and $Na_3V_2(PO_4)_3$/Graphene Cathodes

The $Na_3V_2(PO_4)_3$/C sample was synthesized by a solid state reaction according to the following procedure: a stoichiometric mixture of $NaH_2PO_4.2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$. After ball milling, the mixture was pressed into a pellet and then heated at 900° C. for 24 h in Ar atmosphere. Separately, the $Na_3V_2(PO_4)_3$/graphene cathode was prepared in a similar manner, but with sugar replaced by graphene oxide. Cathode particulates composed of these particles, a polymer gel electrolyte (1 M of $NaPF_6$ salt in PC+DOL, plus 0.1% PEO) were produced using a pan-coating method. The cathode active materials were used in several Na metal cells containing 1 M of $NaPF_6$ salt in PC+DOL as the electrolyte. Both conventional Na metal cells and instant cells featuring cathode particulates were made.

Example 13: Organic Material ($Li_2C_6O_6$) as a Cathode Active Material of a Lithium Metal Battery In order to synthesize dilithium rhodizonate ($Li_2C_6O_6$), the rhodizonic acid dihydrate (species 1 in the following scheme) was used as a precursor. A basic lithium salt, $Li_2CO_3$ can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

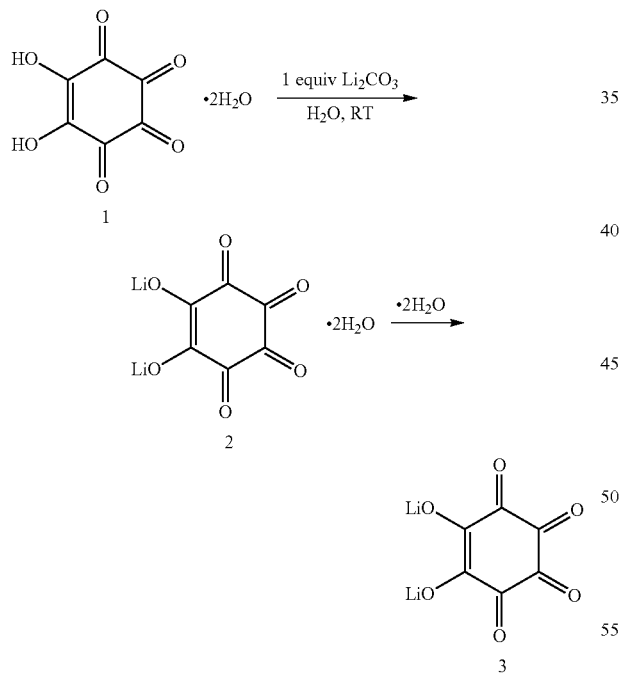

side. Hence, there must be a lithium source (e.g. lithium metal or lithium metal alloy) at the anode. The anode current collector (Cu foil) is deposited with a layer of lithium (e.g. via sputtering or electrochemical plating). This can be done prior to assembling the lithium-coated layer (or simply a lithium foil), a porous separator, and an impregnated cathode roll into a casing envelop. The cathode active material and conductive additive ($Li_2C_6O_6$/C composite particles+CNTs) wetted with the liquid electrolyte were made into cathode particulates using a pan-coating method. For comparison, a corresponding conventional Li metal cell was also fabricated by the conventional procedures of slurry coating, drying, laminating, packaging, and electrolyte injection.

Example 14: Organic Material ($Na_2C_6O_6$) as a Cathode Active Material of a Sodium Metal Battery In order to synthesize disodium rhodizonate ($Na_2C_6O_6$), the rhodizonic acid dihydrate (species 1 in the following scheme) was used as a precursor. A basic sodium salt, $Na_2CO_3$ can be used in aqueous media to neutralize both enediolic acid functions. Strictly stoichiometric quantities of both reactants, rhodizonic acid and sodium carbonate, were allowed to react for 10 hours to achieve a yield of 80%. Disodium rhodizonate (species 2) was readily soluble even in a small amount of water, implying that water molecules are present in species 2. Water was removed in a vacuum at 180° C. for 3 hours to obtain the anhydrous version (species 3).

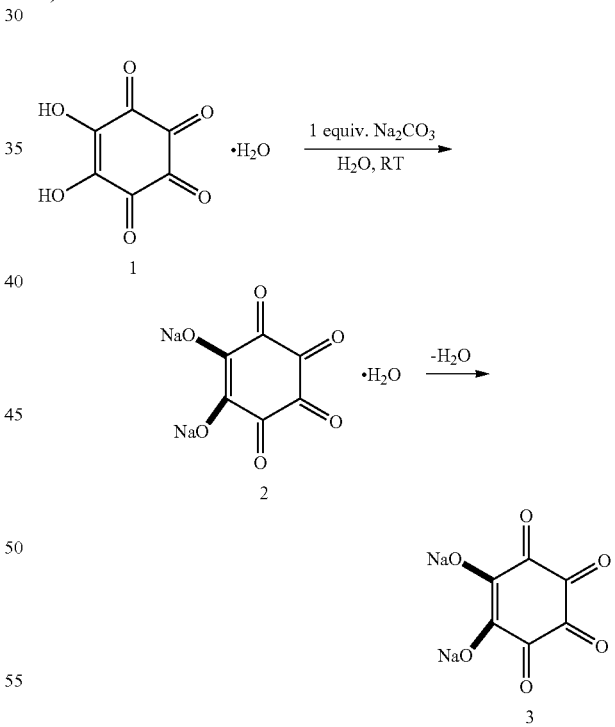

A mixture of a cathode active material ($Li_2C_6O_6$) and a conductive additive (carbon black, 15%) was ball-milled for 10 minutes and the resulting blend was grinded to produce composite particles. The electrolyte was 1M of lithium hexafluorophosphate ($LiPF_6$) in PC-EC.

It may be noted that the two Li atoms in the formula $Li_2C_6O_6$ are part of the fixed structure and they do not participate in reversible lithium ion storing and releasing. This implies that lithium ions must come from the anode A mixture of a cathode active material ($Na_2C_6O_6$) and a conductive additive (carbon black, 15%) was ball-milled for 10 minutes and the resulting blend was grinded to produce composite particles. The electrolyte was 1M of sodium hexafluorophosphate ($NaPF_6$) in PC-EC.

The two Na atoms in the formula $Na_2C_6O_6$ are part of the fixed structure and they do not participate in reversible lithium ion storing and releasing. The sodium ions must come from the anode side. Hence, there must be a sodium source (e.g. sodium metal or sodium metal alloy) at the anode. An anode current collector (Cu foil) was deposited with a layer of sodium (e.g. via sputtering or electrochemical plating). This was done prior to assembling the sodium-coated layer or simply a sodium foil, a porous separator, and a cathode roll into a dry cell. The cathode active material and conductive additive ($Na_2C_6O_6$/C composite particles+RGO) dispersed in the liquid electrolyte were made into cathode particulates.

Example 15: Metal Naphthalocyanine-RGO Hybrid Cathode of a Lithium Metal Battery CuPc-coated graphene sheets were obtained by vaporizing CuPc in a chamber along with a graphene film (5 nm) prepared from spin coating of RGO-water suspension. The resulting coated film was cut and milled to produce CuPc-coated graphene sheets, which were mixed with a gel electrolyte (3.5 M of $LiClO_4$ in propylene carbonate) and made into cathode particulates. This battery has a lithium metal foil as the anode active material and 3.5 M of $LiClO_4$ in propylene carbonate (PC) solution as the electrolyte. A conventional lithium metal cell was made and tested for comparison.

Example 16: Preparation of $MoS_2$/RGO Hybrid Material as a Cathode Active Material of a Lithium Metal Battery A wide variety of inorganic materials were investigated in this example. For instance, an ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4.H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried, mixed with liquid electrolyte and some CNFs to produce cathode particulates.

Example 17: Preparation of Two-Dimensional (2D) Layered $Bi_2Se_3$ Chalcogenide Nanoribbons The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were mixed with some CNTs and dispersed in a desired polymer gel electrolyte ($LiPF_6$+PC-EC+PEO) to form a slurry. The slurry was made into cathode particulates using spray-drying.

Example 18: Preparation of Graphene-Supported $MnO_2$ Cathode Active Material The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was mixed in a liquid electrolyte to form cathode particulates.

Example 19: Preparation and Electrochemical Testing of Various Alkali Metal Battery Cells For most of the anode and cathode active materials investigated, we prepared alkali metal-ion cells or alkali metal cells using both the presently invented method and the conventional method.

With the conventional method, a typical anode composition includes 85 wt. % active material (e.g., Si- or $Co_3O_4$-coated graphene sheets), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

With the instant cell, typically no binder resin is needed or used, saving 8% weight (reduced amount of non-active materials). The cell was made into a shape as illustrated in FIG. 1(E). The cathode is typically composed of a mass of cathode particulates disposed in a container. An Al foil is disposed at the bottom of the container as a cathode current collector. A certain amount of anode particulates, with or without an additional amount of a liquid electrolyte, were then extruded into anode rods having a diameter from 50 μm to 1 cm and having a thin Cu wire as an anode current collector. These rods were wrapped around with a porous membrane (Celgard 2400) and then inserted into the cathode bath. One or multiple anode rods can be inserted into a cathode bath.

In certain cases, as an alternative battery cell configuration, a mass of anode particulates was disposed in a container and one or multiple cathode rods wrapped with a porous membrane are inserted into the anode mass.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

Example 20: Representative Testing Results for Lithium Cells

For each sample, several current densities (representing charge/discharge rates) were imposed to determine the electrochemical responses, allowing for calculations of energy density and power density values required of the construction of a Ragone plot (power density vs. energy density).

Figure 3:
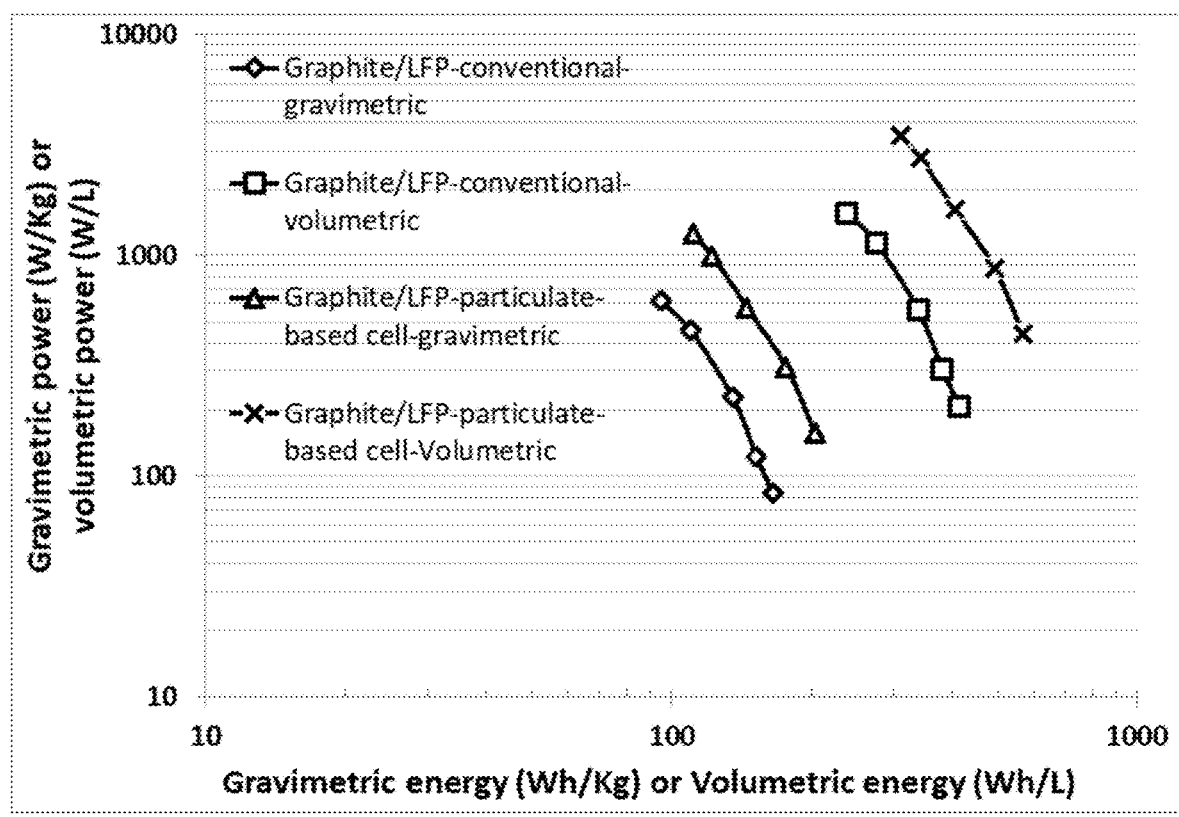
FIG. 3 Ragone plots (gravimetric and volumetric power density vs. energy density) of lithium-ion battery cells containing graphite particles as the anode active material and carbon-coated LFP particles as the cathode active materials. Two of the 4 data curves are for the particulate-based cells (containing presently invented anode particulates and cathode particulates) prepared according to an embodiment of instant invention and the other two by the conventional slurry coating of electrodes (roll-coating).

Shown in FIG. 3 are Ragone plots (gravimetric and volumetric power density vs. energy density) of lithium-ion battery cells containing graphite particles as the anode active material and carbon-coated LFP particles as the cathode active materials. Two of the 4 data curves are for the presently invented cells (featuring the invented anode particulates and cathode particulates) prepared according to an embodiment of instant invention and the other two by the conventional slurry coating of electrodes (roll-coating). Several significant observations can be made from these data:

Both the gravimetric and volumetric energy densities and power densities of the lithium-ion battery cells prepared by the presently invented method are significantly higher than those of their counterparts prepared via the conventional roll-coating method (denoted as "conventional"). The gravimetric energy density is increased from 165 Wh/kg of a conventional cell to 205 Wh/kg of a currently invented cell. Also surprisingly, the volumetric energy density is increased from 412.5 Wh/L to 573 Wh/L. This latter value of 573 Wh/L has never been previously achieved with a conventional lithium-ion battery using a graphite anode and a lithium iron phosphate cathode.

These differences are likely due to the significantly higher active material mass loading associated with the presently invented cells, reduced proportion of overhead (non-active) components relative to the active material weight/volume, and surprisingly better utilization of the electrode active material (most, if not all, of the graphite particles and LFP particles contributing to the lithium ion storage capacity; no dry pockets or ineffective spots in the electrode, particularly under high charge/discharge rate conditions). These have not been taught, suggested, or even slightly hinted in the art of lithium-ion battery. Furthermore, the maximum power density is increased from 621 W/kg to 1,440 W/kg. This might have been due to significantly reduced internal resistance against electron transport and lithium ion transport.

Figure 4:
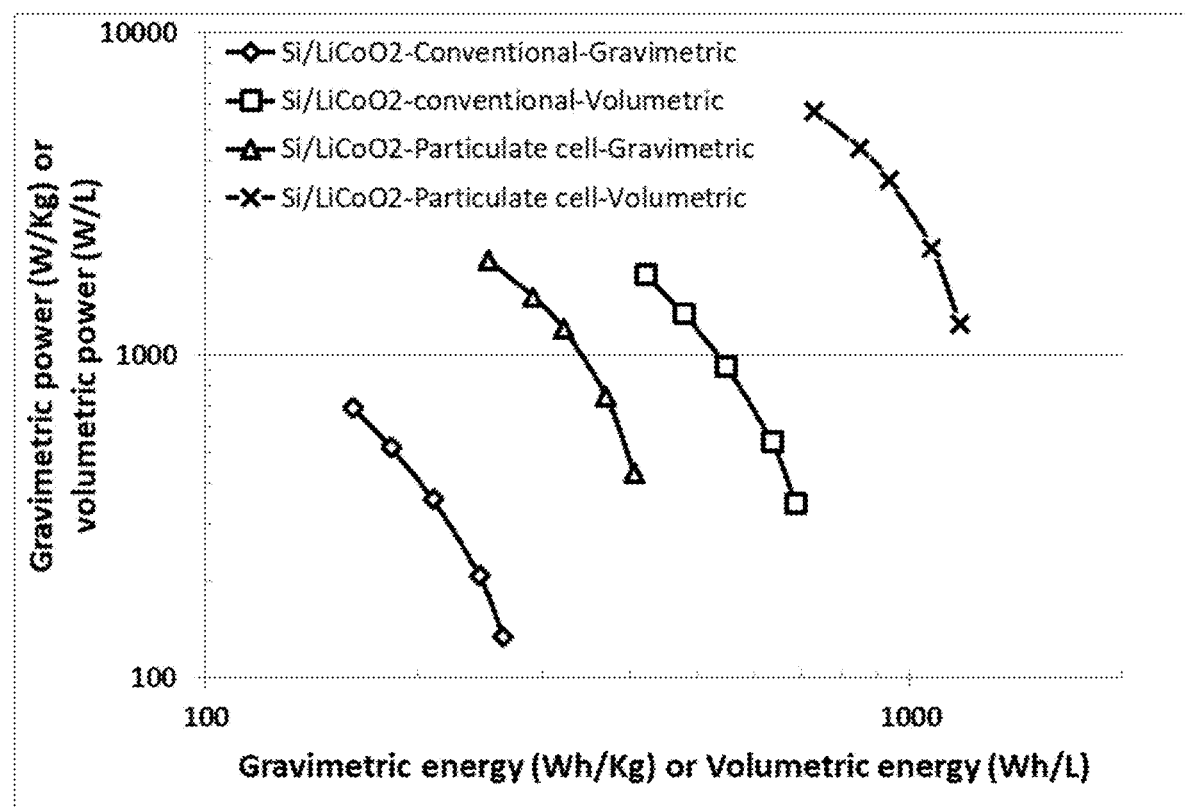
FIG. 4 Ragone plots (both gravimetric and volumetric power density vs. gravimetric and volumetric energy density) of two cells, both containing graphene-embraced Si nanoparticles as the anode active material and $LiCoO_2$ nanoparticles as the cathode active material. The experimental data were obtained from both the particulate-based Li-ion battery cells (containing extra discrete layers of electrolyte) and conventional cells.

FIG. 4 shows the Ragone plots (both gravimetric and volumetric power density vs. gravimetric and volumetric energy density) of two cells, both containing graphene-embraced Si nanoparticles as the anode active material and $LiCoO_2$ nanoparticles as the cathode active material. The experimental data were obtained from the invented Li-ion battery cells that presently invented anode particulate and cathode particulates and the conventional cells prepared by the conventional slurry coating of electrodes.

These data indicate that both the gravimetric and volumetric energy densities and power densities of the battery cells prepared by the presently invented method are significantly higher than those of their counterparts prepared via the conventional method. Again, the differences are huge. The conventionally made cells exhibit a gravimetric energy density of 265 Wh/kg and volumetric energy density of 689 Wh/L, but the presently invented cells deliver 403 Wh/kg and 1,188 Wh/L, respectively. The cell-level energy density of 1,188 Wh/L, has never been previously achieved with any conventional rechargeable lithium battery. The power densities as high as 1,978 W/kg and 5,750 W/L are also unprecedented for lithium-ion batteries. The power densities of the cells prepared according to the presently invented approach are always significantly higher than those of the corresponding cells prepared by conventional processes.

These energy density and power density differences are mainly due to the high active material mass loading (>25 mg/cm² in the anode and >45 mg/cm² in the cathode) associated with the presently invented cells, reduced proportion of overhead (non-active) components relative to the active material weight/volume, and the ability of the inventive method to better utilize the active material particles (all particles being accessible to liquid electrolyte and fast ion and electron kinetics).

Figure 5:
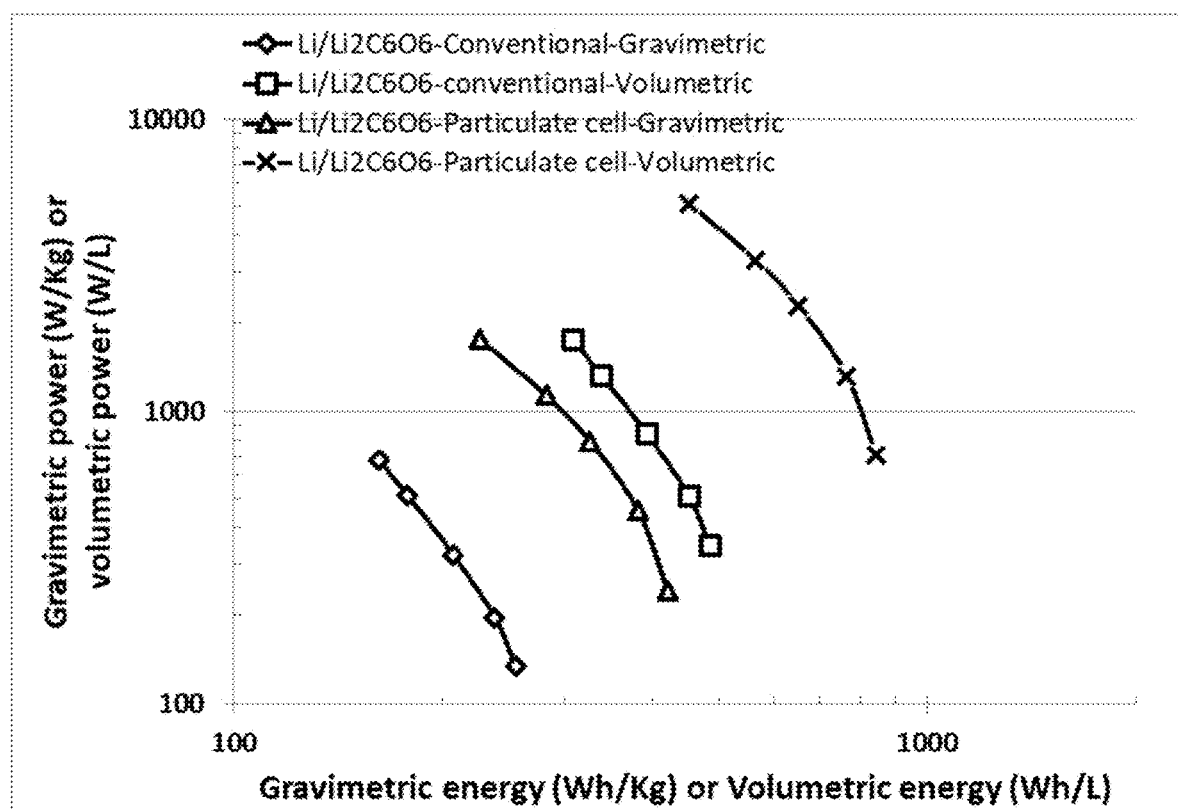
FIG. 5 Ragone plots of lithium metal batteries containing a lithium foil as the anode active material, dilithium rhodizonate ($Li_2C_6O_6$) as the cathode active material (formed into a cathode roll), and lithium salt ($LiPF_6$)—PC/DEC as organic liquid electrolyte. The data are for both the particulate-based lithium metal cells prepared by the presently invented method and those conventional cells by the conventional slurry coating of electrodes.

Shown in FIG. 5 are Ragone plots of lithium metal batteries containing a lithium foil as the anode active material, dilithium rhodizonate ($Li_2C_6O_6$) as the cathode active material, and lithium salt ($LiPF_6$)—PC/DEC as organic liquid electrolyte. The data are for both lithium metal cells prepared by the presently invented method and those by the conventional slurry coating of electrodes. These data indicate that both the gravimetric and volumetric energy densities and power densities of the lithium metal cells prepared by the presently invented method are significantly higher than those of their counterparts prepared via the conventional method. Again, the differences are huge and are likely due to the significantly higher active material mass loading (not just mass loading) associated with the presently invented cells, reduced proportion of overhead (non-active) components relative to the active material weight/volume, and surprisingly better utilization of the electrode active material (most, if not all, of the active material contributing to the lithium ion storage capacity; no dry pockets or ineffective spots in the electrode, particularly under high charge/discharge rate conditions).

Quite noteworthy and unexpected is the observation that the gravimetric energy density of the presently invented lithium metal-organic cathode cell is as high as 422 Wh/kg, higher than those of all rechargeable lithium-metal or lithium-ion batteries ever reported (recall that current Li-ion batteries store 150-220 Wh/kg based on the total cell weight). Also quite astonishing is the observation that the volumetric energy density of such an organic cathode-based battery is as high as 844 Wh/L, an unprecedentedly high value that tops those of all conventional lithium-ion and lithium metal batteries ever reported. Furthermore, for organic cathode active material-based lithium batteries, a gravimetric power density of 1,766 W/kg and maximum volumetric power density of 5,125 W/L would have been un-thinkable.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 100-200 µm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 µm, and mostly <<50 µm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Because the weight of the anode and cathode active materials combined accounts for up to about 30%-50% of the total mass of the packaged commercial lithium batteries, a factor of 30%-50% must be used to extrapolate the energy or power densities of the device from the performance data of the active materials alone. Thus, the energy density of 500 Wh/kg of combined graphite and NMC (lithium nickel manganese cobalt oxide) weights will translate to about 150-250 Wh/kg of the packaged cell. However, this extrapolation is only valid for electrodes with thicknesses and densities similar to those of commercial electrodes (150 µm or about 15 mg/cm² of the graphite anode and 30 mg/cm² of NMC cathode). An electrode of the same active material that is thinner or lighter will mean an even lower energy or power density based on the cell weight. Thus, it would be desirable to produce a lithium-ion battery cell having a high active material proportion. Unfortunately, it has not been previously possible to achieve a total active material proportion greater than 45% by weight in most of the commercial lithium-ion batteries.

The presently invented method enables the lithium batteries to go well beyond these limits for all active materials investigated. As a matter of fact, the instant invention makes it possible to elevate the active material proportion above 90% if so desired; but typically from 45% to 85%, more typically from 40% to 80%, even more typically from 40% to 75%, and most typically from 50% to 70%.

Example 21: Representative Testing Results of Sodium Metal Cells

Figure 6:
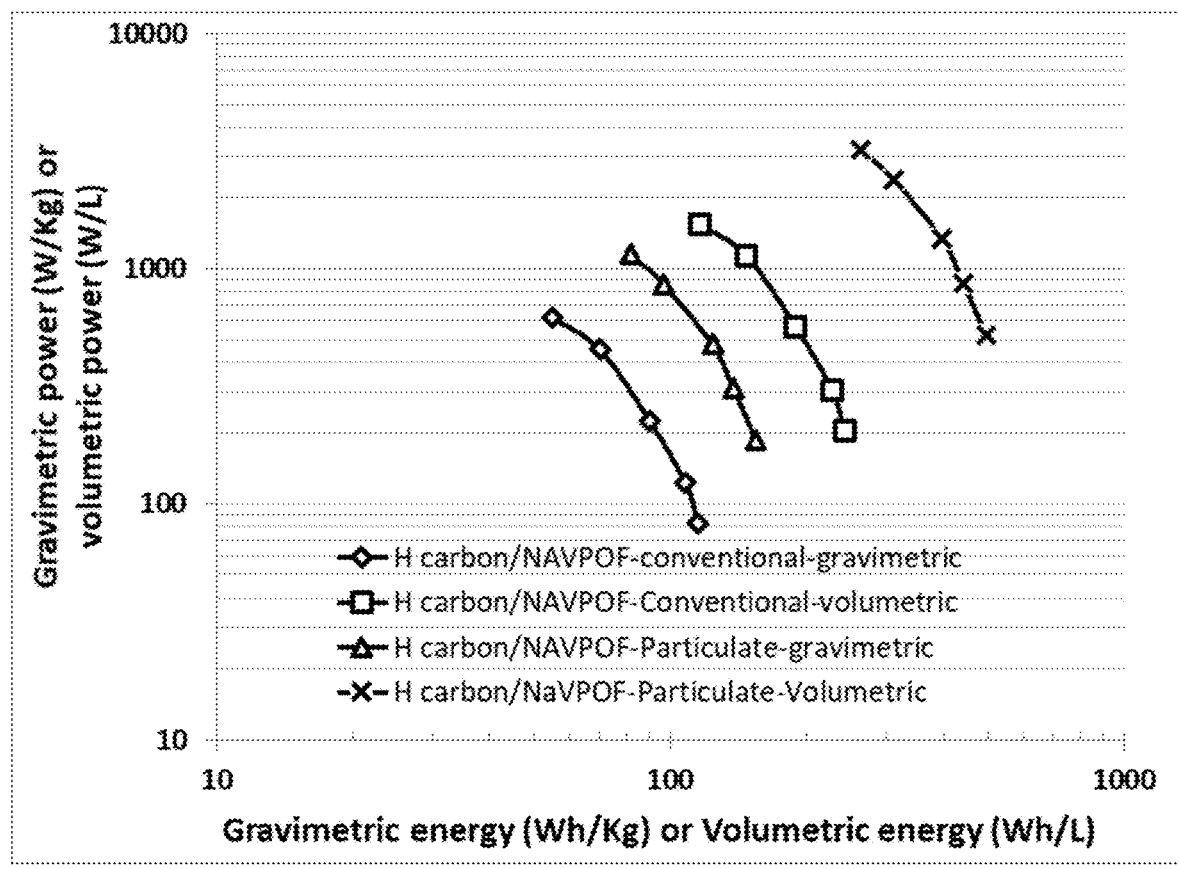
FIG. 6 Ragone plots (gravimetric and volumetric power density vs. energy density) of Na-ion battery cells containing hard carbon particles as the anode active material and carbon-coated $Na_3V_2(PO_4)_2F_3$ particles as the cathode active materials. Two of the 4 data curves are for the cells prepared according to an embodiment of instant invention (containing anode particulates and cathode particulates of the instant invention) and the other two by the conventional slurry coating of electrodes (roll-coating).

Shown in FIG. 6 are Ragone plots (gravimetric and volumetric power density vs. energy density) of Na-ion battery cells containing hard carbon particles as the anode active material and carbon-coated $Na_3V_2(PO_4)_2F_3$ particles as the cathode active materials. Two of the 4 data curves are for the cells (containing anode particulates and cathode particulates) prepared according to an embodiment of instant invention and the other two by the conventional slurry coating of electrodes (roll-coating). Several significant observations can be made from these data:

Both the gravimetric and volumetric energy densities and power densities of the sodium-ion battery cells prepared by the presently invented method are significantly higher than those of their counterparts prepared via the conventional roll-coating method (denoted as "conventional"). The gravimetric energy density for the conventional Na-ion cell is 115 Wh/kg, but that for the particulate-based Na-ion cell is 158 Wh/kg. Also surprisingly, the volumetric energy density is increased from 241 Wh/L to 498 Wh/L by using the presently invented approach. This latter value of 496 Wh/L is exceptional for a conventional sodium-ion battery using a hard carbon anode and a sodium transition metal phosphate-type cathode.

These huge differences are likely due to the significantly higher active material mass loading (relative to other materials) associated with the presently invented cells, reduced proportion of overhead (non-active) components relative to the active material weight/volume, and surprisingly better utilization of the electrode active material (most, if not all, of the hard carbon particles and $Na_3V_2(PO_4)_2F_3$ particles contributing to the sodium ion storage capacity; no dry pockets or ineffective spots in the electrode, particularly under high charge/discharge rate conditions).

The presently invented sodium-ion cells also deliver significantly higher power densities than those of conventional cells. This is also unexpected.

Figure 7:
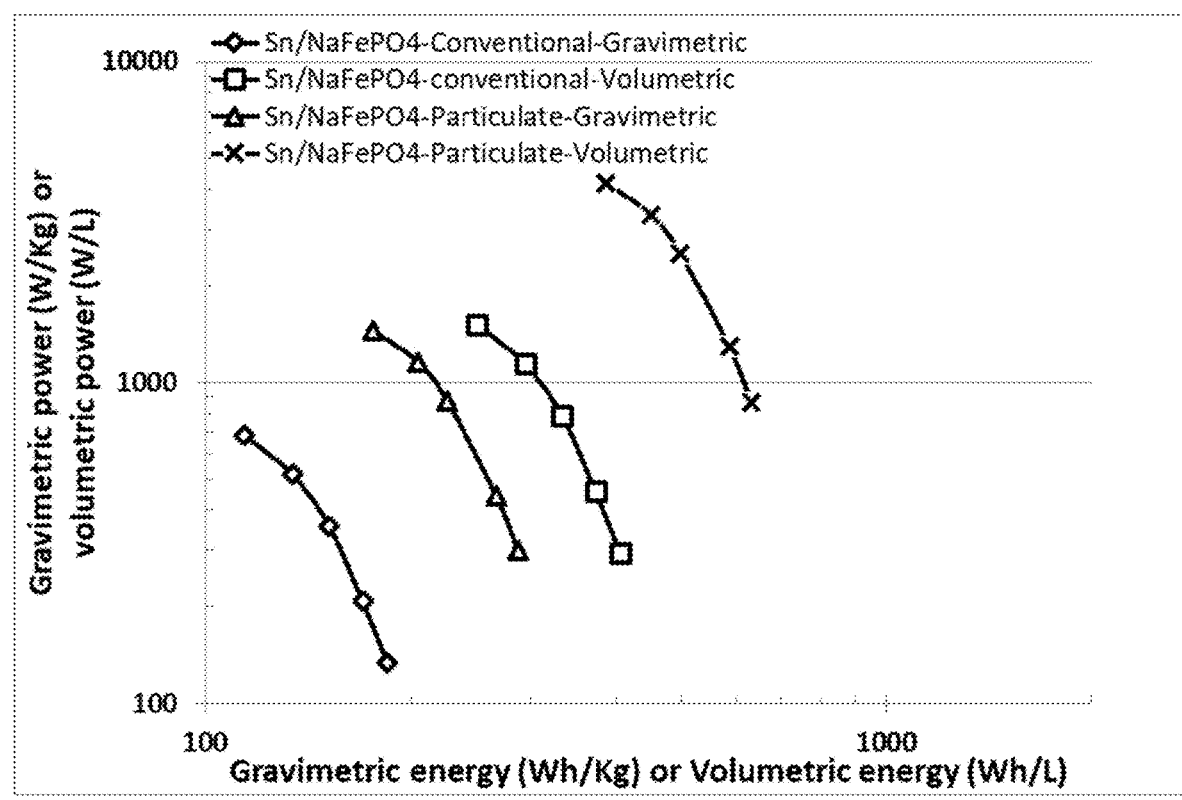
FIG. 7 Ragone plots (both gravimetric and volumetric power density vs. gravimetric and volumetric energy density) of two cells, both containing graphene-embraced Sn nanoparticles as the anode active material and $NaFePO_4$ nanoparticles as the cathode active material. The data are for both sodium-ion cells prepared by the presently invented method and those by the conventional slurry coating of electrodes.

FIG. 7 shows the Ragone plots (both gravimetric and volumetric power density vs. gravimetric and volumetric energy density) of two cells, both containing graphene-embraced Sn nanoparticles as the anode active material and $NaFePO_4$ nanoparticles as the cathode active material. The experimental data were obtained from the Na-ion battery cells that were prepared by the presently invented method (i.e. using anode particulates and cathode particulates) and those by the conventional slurry coating of electrodes.

These data indicate that both the gravimetric and volumetric energy densities and power densities of the sodium battery cells prepared by the presently invented method are significantly higher than those of their counterparts prepared via the conventional method. Again, the differences are huge. The conventionally made cells exhibit a gravimetric energy density of 185 Wh/kg and volumetric energy density of 407 Wh/L, but the presently invented cells deliver 289 Wh/kg and 638 Wh/L, respectively. The cell-level volumetric energy density of 638 Wh/L has never been previously achieved with any conventional rechargeable sodium batteries. The power densities as high as 1444 W/kg and 4,187 W/L are also unprecedented for typically higher-energy lithium-ion batteries, let alone for sodium-ion batteries.

These energy density and power density differences are mainly due to the high active material mass loading (>25 mg/cm² in the anode and >45 mg/cm² in the cathode) associated with the presently invented cells, reduced proportion of overhead (non-active) components relative to the active material weight/volume, no need to have a binder resin, and the ability of the inventive method to better utilize the active material particles (all particles being accessible to liquid electrolyte and fast ion and electron kinetics).

Figure 8:
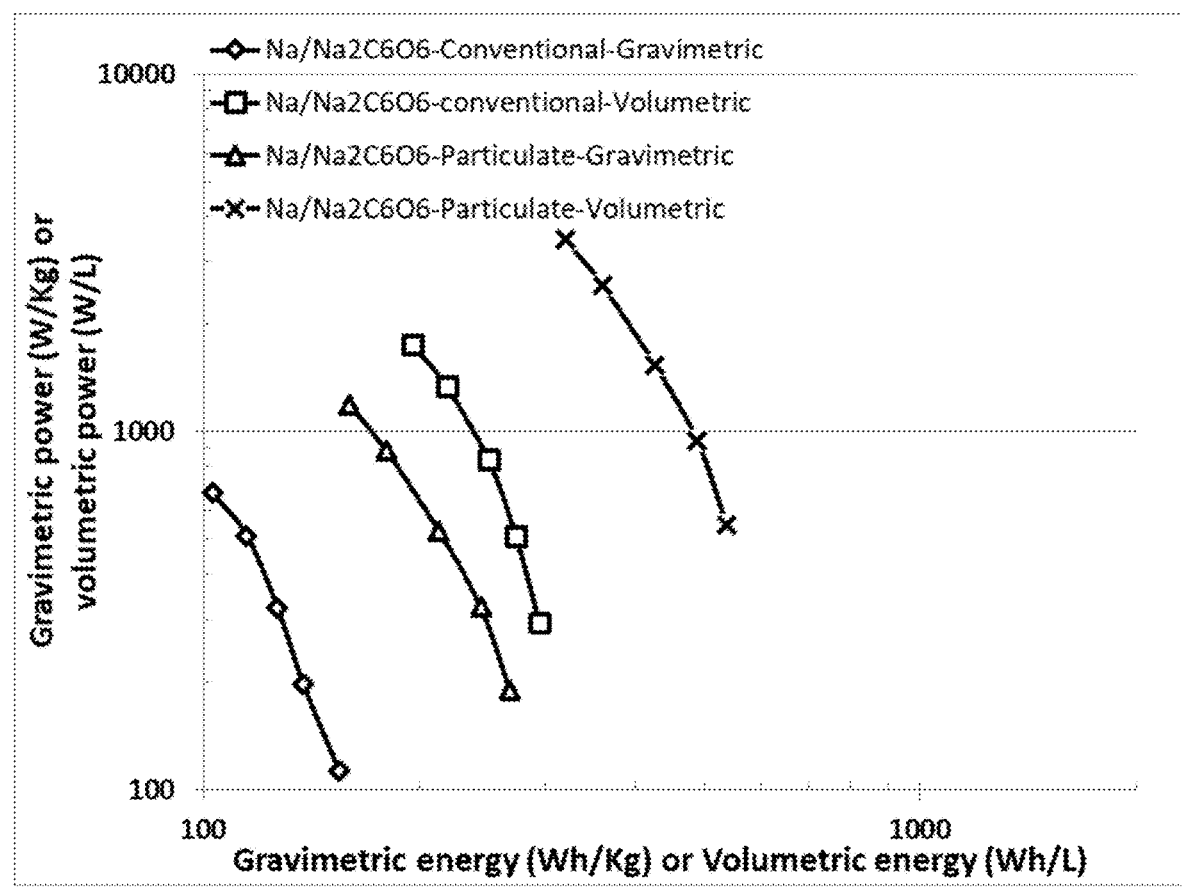
FIG. 8 Ragone plots of sodium metal batteries containing a graphene-supported sodium foil as the anode active material, disodium rhodizonate ($Na_2C_6O_6$) as the cathode active material, and sodium salt ($NaPF_6$)—PC/DEC as organic liquid electrolyte. The data are for both sodium metal cells prepared by the presently invented method and those by the conventional slurry coating of electrodes.

Shown in FIG. 8 are Ragone plots of sodium metal batteries containing a sodium foil as the anode active material, disodium rhodizonate ($Na_2C_6O_6$) as the cathode active material, and lithium salt ($NaPF_6$)—PC/DEC as organic liquid electrolyte. The data are for both sodium metal cells prepared by the presently invented method and those by the conventional slurry coating of electrodes. These data indicate that both the gravimetric and volumetric energy densities and power densities of the rolled sodium metal cells prepared by the presently invented method are significantly higher than those of their counterparts prepared via the conventional method.

Quite noteworthy and unexpected is the observation that the gravimetric energy density of the presently invented sodium metal-organic cathode cell is as high as 268 Wh/kg, higher than those of all conventional rechargeable sodium metal or sodium-ion batteries ever reported (recall that current Na-ion batteries typically store 100-150 Wh/kg based on the total cell weight). Furthermore, for organic cathode active material-based sodium batteries (even for corresponding lithium batteries), a gravimetric power density of 1,200 W/kg and volumetric power density of 3,465 W/L would have been un-thinkable.

We claim:

1. An anode particulate having a dimension from 10 nm to 100 μm for use in an alkali metal battery, said particulate comprising (i) an anode active material capable of reversibly absorbing and desorbing lithium ions or sodium ions, (ii) an electron-conducting material, and (iii) a lithium ion-conducting or sodium ion-conducting electrolyte, wherein said electron-conducting material forms a three dimensional network of electron-conducting pathways in electronic contact with said anode active material and said electrolyte forms a three dimensional network of lithium ion- or sodium ion-conducting channels in ionic contact with said anode active material and wherein said anode particulate has an electrical conductivity from about $10^{-6}$ S/cm to about 300 S/cm.

2. The anode particulate of claim 1, wherein said alkali metal battery is a lithium-ion battery and said anode active material is selected from the group consisting of:
   (a) particles of natural graphite, artificial graphite, meso-carbon microbeads (MCMB), needle coke, carbon particles, carbon fibers, carbon nanotubes, and carbon nanofibers;
   (b) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
   (c) alloys or intermetallic compounds of Si, Ge, Sn, Pb, Sb, Bi, Zn, Al, or Cd with other elements, wherein said alloys or compounds are stoichiometric or non-stoichiometric;
   (d) oxides, carbides, nitrides, sulfides, phosphides, selenides, and tellurides of Si, Ge, Sn, Nb, Mo, Pb, Sb, Bi, Zn, Al, Fe, Ni, Co, Ti, Mn, or Cd, and their mixtures or composites;
   (e) pre-lithiated versions thereof;
   (f) pre-lithiated graphene sheets; and
   combinations thereof.

3. The anode particulate of claim 1, wherein the alkali metal battery is a sodium-ion battery and said anode active material contains an alkali intercalation compound selected from the following groups of materials:
   (a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (b) sodium- or potassium-containing alloys or intermetallic compounds of Si, Ge, Sn, Pb, Sb, Bi, Zn, Al, Ti, Co, Ni, Mn, Cd, and their mixtures;
   (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
   (d) sodium or potassium salts; and
   (e) graphene sheets pre-loaded with sodium or potassium; and
   (f) combinations thereof.

4. The anode particulate of claim 1, wherein said alkali metal battery is a sodium-ion battery and said anode active material contains an alkali intercalation compound selected from petroleum coke, carbon black, amorphous carbon, activated carbon, hard carbon, soft carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$ (sodium terephthalate), $TiO2$, $Na_xTiO_2$ (0.2<x<1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, and combinations thereof.

5. The anode particulate of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, prelithiated $Mn_3O_4$, or a combination thereof, wherein $1 \leq x \leq 2$.

6. The anode particulate of claim 1, wherein said anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

7. The anode particulate of claim 1, wherein said anode active material is coated with a layer of carbon, a conducting polymer, or a graphene sheet.

8. The anode particulate of claim 1, wherein said electron-conducting material is selected from polyaniline, polypyrrole, polythiophene, polyfuran, a bi-cyclic polymer, a sulfonated derivative thereof, and combinations thereof.

9. The anode particulate of claim 1, further comprising a resin binder.

10. The anode particulate of claim 1, wherein said electrolyte has a lithium ion conductivity or sodium ion conductivity no less than $10^{-7}$ S/cm at room temperature.

11. The anode particulate of claim 1, wherein said electrolyte is selected from an aqueous electrolyte, an organic liquid electrolyte, an ionic liquid electrolyte, a polymer gel electrolyte, a polymer electrolyte, an inorganic solid state electrolyte, a quasi-solid electrolyte, and combinations thereof.

12. The anode particulate of claim 1, wherein said electron-conducting material is selected from a conducting polymer, a carbon fiber or graphite fiber, a carbon nanotube, a carbon nanofiber, a graphitic nanofiber, a conductive polymer fiber, a metal nanowire, a metal-coated fiber, a graphene sheet, an expanded graphite platelet, carbon black, acetylene black, needle coke, and combinations thereof.

13. The anode particulate of claim 2, wherein said pre-lithiated graphene sheets are selected from pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, and combinations thereof.

14. A powder mass containing a plurality of the anode particulates as defined in claim 1.

15. An anode containing multiple anode particulates of claim 1.

16. The anode of claim 15, wherein each particulate has an electron-conducting material forming a 3D network of electron-conducting pathways in electronic contact with the anode active material and the electrolyte in each particulate forms a 3D network of lithium ion- or sodium ion-conducting channels in ionic contact with the anode active material and wherein multiple three dimensional networks of electron-conducting pathways in the multiple anode particulates are merged into one large three dimensional network of electron-conducting pathways substantially extended throughout the entire anode and wherein multiple three dimensional networks of lithium ion- or sodium ion-conducting channels in the multiple anode particulates are merged into one large three dimensional network of lithium ion- or sodium ion-conducting channels substantially extended throughout the entire anode.

17. A lithium battery or sodium battery containing an optional anode current collector, the anode as defined in claim 15, a cathode containing a cathode active material capable of reversibly absorbing and desorbing lithium ions or sodium ions, an optional cathode current collector, an electrolyte in ionic contact with said anode and said cathode, and an optional porous separator.

18. A cathode particulate for a lithium battery or sodium battery, wherein said cathode particulate is composed of (i) the cathode active material, (ii) an electron-conducting material, and (iii) a lithium ion-conducting or sodium ion-conducting electrolyte, wherein the electron-conducting material forms a three dimensional network of electron-conducting pathways in electronic contact with the cathode active material and the electrolyte forms a three dimensional network of lithium ion- or sodium ion-conducting channels in ionic contact with the cathode active material, and wherein said cathode particulate has a dimension from 10 nm to 100 μm and an electrical conductivity from about $10^{-6}$ S/cm to about 300 S/cm.

19. A powder mass containing a plurality of the cathode particulates as defined in claim 18.

20. A cathode containing multiple cathode particulates of claim 18.

21. A lithium battery or sodium battery containing an optional anode current collector, an anode containing an anode active material capable of reversibly absorbing and desorbing lithium ions or sodium ions, the cathode as defined in claim 20, an optional cathode current collector, an electrolyte in ionic contact with said anode and said cathode, and an optional porous separator.

22. The lithium battery or sodium battery of claim 21, which is a lithium-ion battery, sodium-ion battery, lithium metal battery, sodium metal battery, lithium-sulfur battery, room temperature sodium-sulfur battery, lithium-selenium battery, sodium-air battery, or lithium-air battery.

23. The sodium battery of claim 21, wherein said cathode active material contains a sodium intercalation compound or a potassium intercalation compound selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $XNa_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda$-$MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein $0.1 \leq x \leq 1.0$.

24. The lithium battery or sodium battery of claim 21, wherein said cathode active material comprises an alkali metal intercalation compound or alkali metal-absorbing compound selected from an inorganic material, an organic or polymeric material, a metal oxide/phosphate/sulfide, or a combination thereof.

25. The lithium battery or sodium battery of claim 24, wherein said metal oxide/phosphate/sulfide is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, transition metal fluoride, transition metal chloride, or a combination thereof.

26. The lithium battery or sodium battery of claim 24, wherein said inorganic material is selected from sulfur, sulfur compound, lithium polysulfide, transition metal dichalcogenide, a transition metal trichalcogenide, or a combination thereof.

27. The lithium battery or sodium battery of claim 24, wherein said inorganic material is selected from $TiS_2$, $TaS_2$, $MoS_2$, $NbSe_3$, $MnO_2$, $CoO_2$, an iron oxide, a vanadium oxide, or a combination thereof.

28. The lithium battery or sodium battery of claim 24, wherein said metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

29. The lithium battery or sodium battery of claim 24, wherein said metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

30. The lithium battery or sodium battery of claim 24, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, and (e) combinations thereof.

31. The lithium battery or sodium battery of claim 24, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

32. The lithium battery or sodium battery of claim 31, wherein said thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

33. The lithium battery or sodium battery of claim 24, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

34. The lithium battery or sodium battery of claim 24, wherein said cathode active material contains an alkali metal intercalation compound or alkali metal-absorbing compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form having a thickness or diameter less than 100 nm.

* * * * *

UNITED STATES PATENT AND TRADEMARK OFFICE
CERTIFICATE OF CORRECTION

PATENT NO. : 10,637,043 B2  
APPLICATION NO. : 15/827754  
DATED : April 28, 2020  
INVENTOR(S) : Aruna Zhamu et al.

Page 1 of 1

It is certified that error appears in the above-identified patent and that said Letters Patent is hereby corrected as shown below:

In the Claims

Column 41, Line 54, should read:
$Na_2FePO_4F$, $NaFeF_3$, $NaVPO_4F$, $KVPO_4F$, $Na_3V_2(PO_4)_2$ Signed and Sealed this  
Fifth Day of January, 2021

Andrei Iancu  
*Director of the United States Patent and Trademark Office*